US006902481B2

(12) United States Patent
Breckner et al.

(10) Patent No.: US 6,902,481 B2
(45) Date of Patent: Jun. 7, 2005

(54) DECOUPLING OF THE GRAPHICAL PRESENTATION OF A GAME FROM THE PRESENTATION LOGIC

(75) Inventors: Robert E. Breckner, Sparks, NV (US); Greg A. Schlottmann, Reno, NV (US); Nicole M. Beaulieu, Reno, NV (US); Steven G. LeMay, Reno, NV (US); Dwayne R. Nelson, Las Vegas, NV (US); Johnny Palchetti, Las Vegas, NV (US); Jamal Benbrahim, Reno, NV (US)

(73) Assignee: IGT, Reno, NV (US)

( * ) Notice: Subject to any disclaimer, the term of this patent is extended or adjusted under 35 U.S.C. 154(b) by 343 days.

(21) Appl. No.: 10/041,212

(22) Filed: Jan. 7, 2002

(65) Prior Publication Data

US 2003/0064801 A1 Apr. 3, 2003

Related U.S. Application Data

(60) Provisional application No. 60/325,998, filed on Sep. 28, 2001.

(51) Int. Cl.[7] .......... A63F 13/00
(52) U.S. Cl. .......... 463/30; 463/1
(58) Field of Search .......... 463/1, 10–13, 463/16–22, 30–34, 43; 345/629–630, 636, 473

(56) References Cited

U.S. PATENT DOCUMENTS

| | | | | |
|---|---|---|---|---|
| 3,931,504 | A | 1/1976 | Jacoby | 235/153 |
| 4,430,728 | A | 2/1984 | Beitel et al. | 364/900 |
| 4,454,594 | A | 6/1984 | Heffron et al. | 364/900 |
| 5,643,086 | A | 7/1997 | Alcorn et al. | 463/29 |
| 5,761,647 | A | 6/1998 | Boushy | 705/10 |
| 5,851,149 | A | 12/1998 | Xidos et al. | 463/42 |
| 5,971,851 | A | 10/1999 | Pascal et al. | 463/24 |
| 6,099,408 | A | 8/2000 | Schneier et al. | 463/29 |
| 6,104,815 | A | 8/2000 | Alcorn et al. | 380/251 |
| 6,106,396 | A | 8/2000 | Alcorn et al. | 463/29 |
| 6,149,522 | A | 11/2000 | Alcorn et al. | 463/29 |
| 6,253,374 | B1 | 6/2001 | Dresevic et al. | 717/11 |
| 6,331,146 | B1 | 12/2001 | Miyamoto et al. | 463/32 |
| 6,446,257 | B1 | 9/2002 | Pradhan et al. | 717/154 |
| 6,449,687 | B1 | 9/2002 | Moriya | 711/112 |

(Continued)

FOREIGN PATENT DOCUMENTS

| | | | |
|---|---|---|---|
| EP | 0798634 A1 | 11/1997 | G06F/9/44 |
| EP | 0996 058 A1 | 10/1998 | G06F/9/44 |
| EP | 1255234 A2 | 11/2002 | G07F/17/32 |
| WO | WO94/19784 | 9/1994 | G09B/9/05 |
| WO | WO96/00950 | 1/1996 | |
| WO | WO 02/073501 | 9/2002 | G06F/19/00 |

OTHER PUBLICATIONS

Levinthal, Adam and Barnett, Michael, "The Silicon Gaming Odyssey Slot Machine," Feb. 1997, *COMPCON '97 Proceedings, IEEE San Jose, CA; IEEE Comput. Soc.*, pp. 296–301.

*Primary Examiner*—Kim Nguyen
(74) *Attorney, Agent, or Firm*—Beyer, Weaver & Thomas LLP

(57) ABSTRACT

A disclosed gaming machine is designed to execute a modular gaming software architecture. A plurality of gaming software modules may be loaded into RAM on the gaming machine and executed to play a game of chance. Many of the gaming software modules are designed to communicate via application program interfaces so that the logic in many of the gaming software modules may be designed independently of each other. In particular, the modular gaming software architecture allows presentation state logic to be decoupled from implementations of presentation components, such as graphical, audio and gaming device components, used in a presentation of the game of chance on a gaming machine.

33 Claims, 12 Drawing Sheets

U.S. PATENT DOCUMENTS 6,453,319 B1 9/2002 Mattis et al. ............... 707/100
6,454,648 B1 9/2002 Kelly et al. ................... 463/16
2002/0052230 A1 * 5/2002 Martinek et al. ............. 463/10
2002/0116284 A1 * 8/2002 Steelman et al. ............. 705/26

* cited by examiner

DECOUPLING OF THE GRAPHICAL PRESENTATION OF A GAME FROM THE PRESENTATION LOGIC

CROSS-REFERENCE TO RELATED APPLICATIONS

This application claims priority under 35 U.S.C. §119(e) from co-pending U.S. Provisional Patent Application No. 60/325,998, filed Sep. 28, 2001, naming Breckner, et al. as inventors, and titled "Decoupling Of The Graphical Presentation Of A Game From The Presentation Logic," which is incorporated herein in its entirety and for all purposes.

BACKGROUND OF THE INVENTION

This invention relates to gaming software architectures for gaming machines such as slot machines and video poker machines. More particularly, the present invention relates to methods of decoupling the presentation logic from the graphical presentation in the gaming software development process.

Typically, utilizing a master gaming controller, a gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional mechanically driven reel slot machines are being replaced with electronic counterparts having CRT, LCD video displays or the like and gaining machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

To implement the gaming features described above on a gaming machine using computing architectures utilized in the personal computer industry, a number of requirements unique to the gaming industry must be considered. For instance, the gaming machine on the casino floor is a highly regulated device. It is licensed, monitored, taxed and serviced. Typically, within a geographic area allowing gaming, i.e. a gaming jurisdiction, a governing entity is chartered with regulating the games played in the gaming jurisdiction to insure fairness and to prevent cheating. For instance, in many gaming jurisdictions, there are stringent regulatory restrictions for gaming machines requiring a time consuming approval process of 1) new gaming hardware, 2) new gaming software and 3) any software modifications to gaming software used on gaming machines.

As an example of the software regulation and approval process, in many jurisdictions, to regulate gaming software on a gaming machine, a gaming software executable is developed and then burnt onto an EPROM. The EPROM is then submitted to various gaming jurisdictions for approval. After the gaming software is approved, a unique signature is determined for the gaming software stored on the EPROM using a method such as a CRC. Then, when a gaming machine is shipped to a local jurisdiction, the gaming software signature on the EPROM can be compared with an approved gaming software signature prior to installation of the EPROM on the gaming machine. The comparison process is used to ensure that approved gaming software has been installed on the gaming machine. After installation, an access point to the EPROM may be secured with evidence tape as a means of determining whether illegal tampering has occurred with the EPROM. To generate a game of chance on the gaming machine, the approved gaming software is executed from the EPROM.

The requirement to execute the gaming software from an EPROM has strongly influenced gaming software design for gaming machines. For instance to execute from an EPROM, monolithic software architectures, where a single gaming software executable is developed, have been used in the gaming industry. Object oriented software architectures used in the personal computer industry where different software objects may be dynamically linked together prior execution to create many different combinations of executables that perform different functions have not been used in the gaming industry. Further, in most gaming jurisdictions, to load and to unload software objects into RAM connected to a microprocessor and then execute the objects to play a game of chance, there are many regulations, imposed by the gaming jurisdictions, that must be satisfied. Because of these regulations, in the gaming industry, operating systems that allow software objects to be loaded into a RAM connected to a microprocessor have not been used.

Security is another factor that must be considered in the gaming industry. A gaming machine can be capable of accepting, storing and dispensing large sums of money. Thus, gaming machines are often the targets of theft attempts. Gaming software and gaming hardware are designed to resist theft attempts and include many security features not present in personal computers or other gaming platforms. For example, gaming software and hardware are designed to make it extremely difficult to secretly alter the gaming software to trigger an illegal jackpot.

The preservation of critical game information is another factor unique to the design of gaming machines and gaming machine software. Critical game information may include credits deposited into the gaming machine, credits dispensed from the gaming machine, records of games played on the gaming machine and records of access to the gaming machine (e.g., records of doors opened and gaming devices accessed on the gaming machine). For instance, it is not acceptable to lose information regarding money deposited into the gaming machine by a game player or an award presented to a player as a result of a power failure.

Gaming software executed on gaming machines is designed such that critical game information is not lost or corrupted. Therefore, gaming software is designed to prevent critical data loss in the event of software bugs, hardware failures, power failures, electrostatic discharges or tampering with the gaming machine. The implementation of the software design in the gaming software to meet critical data storage requirements may be quite complex and may require extensive of use the nonvolatile memory storage hardware.

Traditionally, in the gaming industry, game design and the game platform design have been performed by single entities. Given the complex and unique requirements in the gaming industry, such as the regulatory environment and the security requirements, a vertically integrated design approach has been employed. Thus, a single gaming machine manufacturer will usually design a plurality of games for a game platform, design and manufacture a gaming machine allowing play of the games and submit the gaming software and gaming hardware for regulatory approval in various gaming jurisdictions.

The approach of the gaming industry may be contrasted with the video game industry. In the video game industry, games for a particular video game platform are typically developed by many companies different from the company that manufactures the video game platform. One trend in the gaming industry is a desire to create a game development environment similar to the video gaming industry where outside vendors may provide games to a gaming machine. It is believed that allowing outside vendors to develop games of chance for gaming machines will increase the games available for gaming machines and lower the costs and risks associated with game development. However, many outside software vendors are reluctant to enter the gaming software market because of the unique requirements of the gaming industry, such as the regulatory which typically increase gaming software development costs.

In view of the above, gaming software developments methods and gaming software architectures are needed that simplify the game development process.

SUMMARY OF THE INVENTION

This invention addresses the needs indicated above by providing a gaming machine that allows a game presentation to be customized using presentation modules. The presentation modules, which may be executed on the gaming machine, include logic for generating presentation components that may stimulate a game player's senses while playing a game of chance on the gaming machine. The presentation modules in conjunction with game flow logic and presentation state logic may be used to generate a game of chance on a gaming machine. The presentation modules may be decoupled from game flow logic and presentation state logic on the gaming machine using one or more APIs. Thus, using the same game flow logic and presentation state logic with different presentation modules, many different games of chance may be provided for game play on the gaming machine. The present invention provides a presentation design system with various templates, libraries and simulators that may be used by a presentation designer to generate a presentation module.

One aspect of the present invention provides a gaming machine. The gaming machine may be generally characterized as comprising: 1) a master gaming controller designed to generate a game of chance played on the gaming machine by executing a plurality of gaming software modules; 2) a memory device storing the plurality of gaming software modules; 3) a gaming operating system comprising logic to load and unload gaming software modules into a RAM from the memory device and control the play of the game of chance; 4) a presentation logic module comprising logic to generate a presentation for the game of chance on the gaming machine; and 5) one or more presentation modules comprising logic to generate a presentation component used as part of the presentation for the game of chance.

In particular embodiments, the one or more presentation modules may communicate with the one or more gaming software modules via an application program interface. The application program interface may be used to communicate sequence events used to control the play of the game of chance. The gaming software module may be a game flow logic software module that generates a sequence of game states used to play the game of chance. The game of chance may be selected from group consisting of slot games, poker games, pachinko games, multiple hand poker games, pai-gow poker games, black jack games, keno games, bingo games, roulette games, craps games, checkers, board games and card games.

In particular embodiments, the presentation of the game of chance may comprise a plurality of presentation states where the presentation logic module further comprises logic that is used to determine one or more presentation components that are used in each presentation state. In general, the presentation component may be designed to stimulate a game player's sight, hearing, touch, smell, taste and combinations thereof. In particular, the presentation component may be at least one of a graphical component, an audio component, a gaming device component and combinations thereof. The presentation component may be presented on a gaming device where the gaming device is at least one of a display screen, an audio output device, a lighting device, a bonus wheel, a mechanical reel, a tactile feedback device and a scent generation device.

In other embodiments, the presentation module may further comprise logic for at least one method sequence that generates a presentation component. The method sequence may comprise one or more input parameters that are used to modify the presentation component generated by the method sequence. Therefore, the method sequence may be used with a first set of input parameters to generate a first presentation component and the method sequence may be used with a second set of input parameters to generate a second presentation component where the first presentation sequence and the second presentation sequence are generated using the same method sequence logic.

The method sequence may operate on a model file to generate the presentation component where the model file comprises a graphical component, an audio component, a gaming device component and combinations thereof. Therefore, the method sequence may operate on a first model file to generate a first presentation component and the method sequence may operate on a second model file to generate a second presentation component where the first presentation component and second presentation component are generated using the same method sequence logic. The method sequence may be used to change a property of a graphical object displayed on a display screen of the gaming machine where the properly is a color, a size, a position, a shading and a texture. The method sequence may also be used to generate an animation sequence. For example, the method sequence may be used to generate a sequence of video frames that provide an animated transition between a first video frame and a second video frame.

Another aspect of the present invention provides a method of generating a presentation component used in a play of a game of chance on a gaming machine. The method may be generally characterized as comprising: 1) receiving a request to generate a presentation component for a presentation state in the game of chance played on the gaming machine; 2) executing one or more method sequences to generate the presentation component; 3) displaying the presentation component on a gaming device; and 4) communicating with gaming software modules via one or more application program interfaces. The gaming software module may be one or more of 1) a gaming operating system software module that loads and unloads gaming software modules into the RAM from a memory device and controls the play of the game of chance, 2) a game flow software module that generates the game flow for the game of chance and 3 presentation state logic module that determines the presentation components that are used in the presentation state where the presentation state may comprise a plurality of presentation substates.

In general, the presentation component may be designed to stimulate a game player's sight, hearing, touch, smell, taste and combinations thereof. In particular, the presentation component may be at least one of a graphical component, a audio component, a gaming device component and combinations thereof. The graphical component may be an animation sequence and the gaming device may be a display screen, an audio output device, a lighting device, a bonus wheel, a mechanical reel, a tactile feedback device and a scent generation device. The game of chance is selected from group consisting of slot games, poker games, pachinko games, multiple hand poker games, pai-gow poker games, black jack games, keno games, bingo games, roulette games, craps games, checkers, board games and card games.

The method may include one or more of the following: 1) sending a message acknowledging the completion of a presentation of the presentation component, 2) executing one or more method sequences to generate a presentation component for at least one of the presentation substates where the method sequence comprises one or more input parameters that are used to modify the presentation component generated by the method sequence, 3) specifying a first set of input parameters for the method sequence, executing the method sequence using the first set of input parameters to generate a first presentation component, specifying a second set of input parameters for the method sequence and executing the method sequence using the second set of input parameters to generate a second presentation component, 4) operating on a model file using a method sequence to generate the presentation component where the model file comprises graphical components, audio components, gaming device components and combinations thereof, and 5) selecting a first model file, operating on the first model file using a method sequence to generate a first presentation component; selecting a second model file, and operating on the second model file using the method sequence to generate a second presentation component.

In other embodiments, the method sequence may be used to change a property of a graphical object displayed on a display screen of the gaming machine. For instance, the property may be a color, a size, a position, a shading and a texture of the graphical object. The method sequence may be used to generate an animation sequence. For example, the method sequence may be used to generate a sequence of video frames that provide an animated transition between a first video frame and a second video frame.

Another aspect of the present invention is a method of providing a presentation component used in a play of a game of chance on a gaming machine. The method may be generally characterized as comprising: 1) providing a method sequence template comprising one or more method sequences; 2) selecting a model file to be operated on by the method sequences; and 3) executing the method sequences to generate a presentation component used in a presentation of the game of chance on the gaming machine.

The method may also comprise one or more of the following: a) storing the method sequences generated from the method sequence template and the model file to a presentation module, b) simulating the presentation module on a presentation interface, c) selecting a model file from a model file library where the model file library comprises graphical models, sound models, gaming device models, scent models and tactile feedback models, d) selecting a method sequence template from a method sequence template library, e) selecting a method used in a method sequence from a method library, f) generating a model file to be operated on by the method sequences, g) converting the model file to a model file format used by the method sequences, h) displaying the presentation component on a present interface, i) specifying one or more input parameters in at least one of the method sequences, j) specifying first set of input parameters in a first method sequence, generating a first presentation component using the first set of input parameters; specifying second set of input parameters in the first method sequence; and generating a second presentation component using the second set of input parameters, and k) selecting a first model file to be operated on by the method sequences; generating a first presentation component using the first model file; selecting a second model file to be operated on by the method sequences; and generating a second presentation component using the second model file.

Another aspect of the present invention provides a presentation design system for designing presentation components for a game of chance on a gaming machine. The presentation design system may comprise: 1) a presentation module design interface for generating a presentation module for a game of chance; a gaming simulator that generates: i) game states and presentation states for the game of chance and ii) presentation components for each presentation state wherein at least one presentation component is generated using the presentation module; and 3) a presentation interface for outputting the presentation components.

In particular embodiments, the presentation module design interface may comprises input mechanisms and output mechanisms for a) completing method sequence templates used to generate a method sequence, b) selecting methods used to generate the method sequence from a method library, c) selecting graphical models from a graphical model library, d) selecting sounds from a sound library, e) selecting gaming devices from a gaming device model library, f) selecting scents from a scent library, g) selecting tastes from a taste library, h) selecting tactile feedback from a tactile feedback library, i) selecting an animation sequence from an animation sequence library and j) converting model formats using a model format converters. The presentation interface may comprise one or more of display devices, audio output devices, light panels, bonus wheels, kinetic feedback devices, scent generation devices and combinations thereof. The gaming simulator may comprise: i) a gaming operating system comprising logic to load and unload gaming software modules into a RAM from a memory device and control the play of the game of chance; ii) a presentation logic module comprising logic to generate the presentation for the game of chance; and iii) game flow logic software module comprising logic to generates a sequence of game states used to play the game of chance.

In particular embodiments, the presentation design system may also include graphical design software for generating a graphical model used in the presentation module. The presentation module may comprise one or more model files and script files with one or more method sequences that operate the one or more model files. The presentation module generates the presentation component for the game of chance on the gaming machine. The presentation component may be designed to stimulate a game player's sight, hearing, touch, smell, taste and combinations thereof while the game player is playing the game of chance on the gaming machine.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media. Yet another embodiment of the present invention is a system for delivering computer readable instructions, such as transmission, over a signal transmission medium, of signals representative of instructions for remotely administering any of the methods as described above.

These and other features of the present invention will be presented in more detail in the following detailed description of the invention and the associated figures.

DESCRIPTION OF THE PREFERRED EMBODIMENTS

Figure 1A:
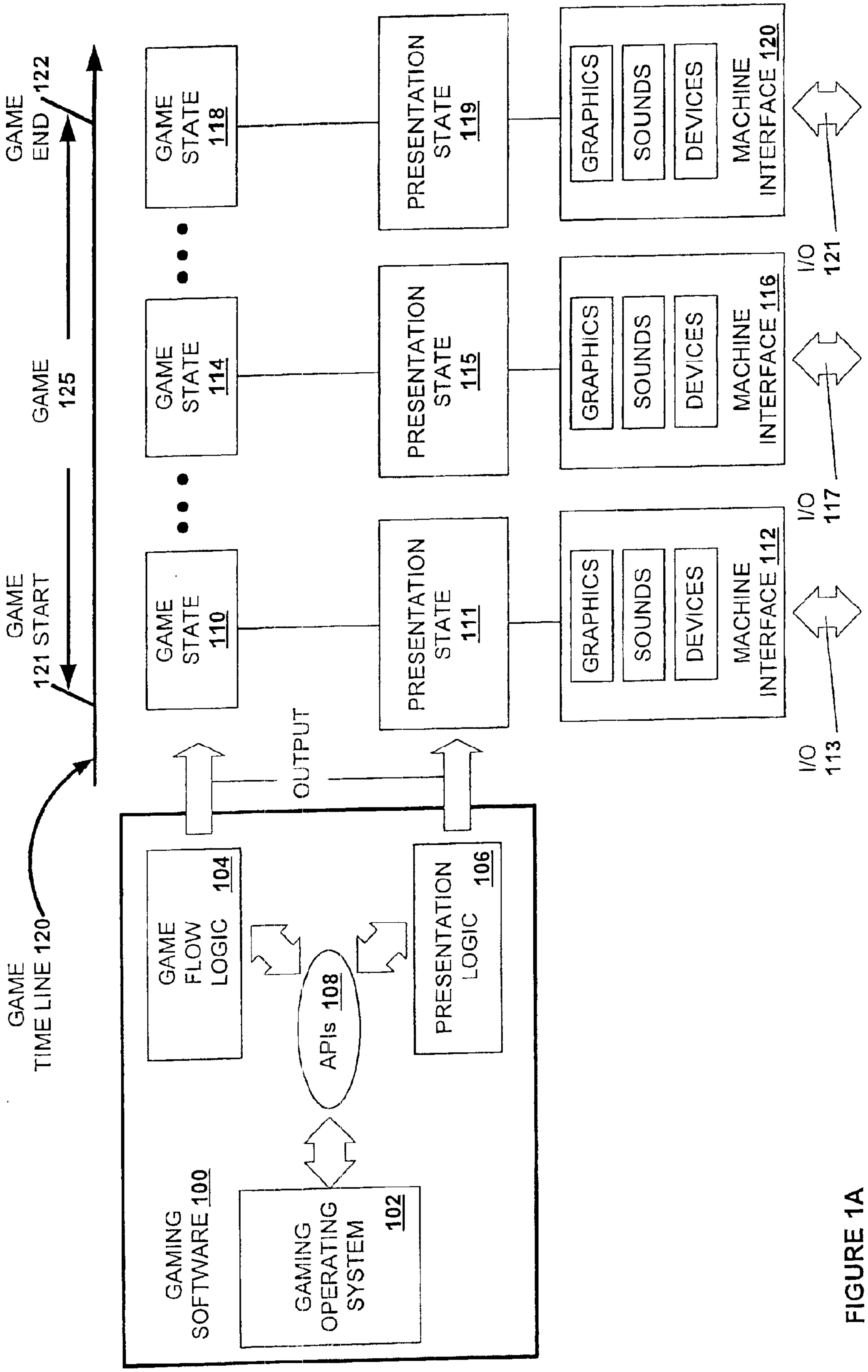
FIGS. 1A and 1B are block diagrams of a gaming machine software architecture providing gaming software for generating a game of chance on a gaming machine.
Figure 1B:
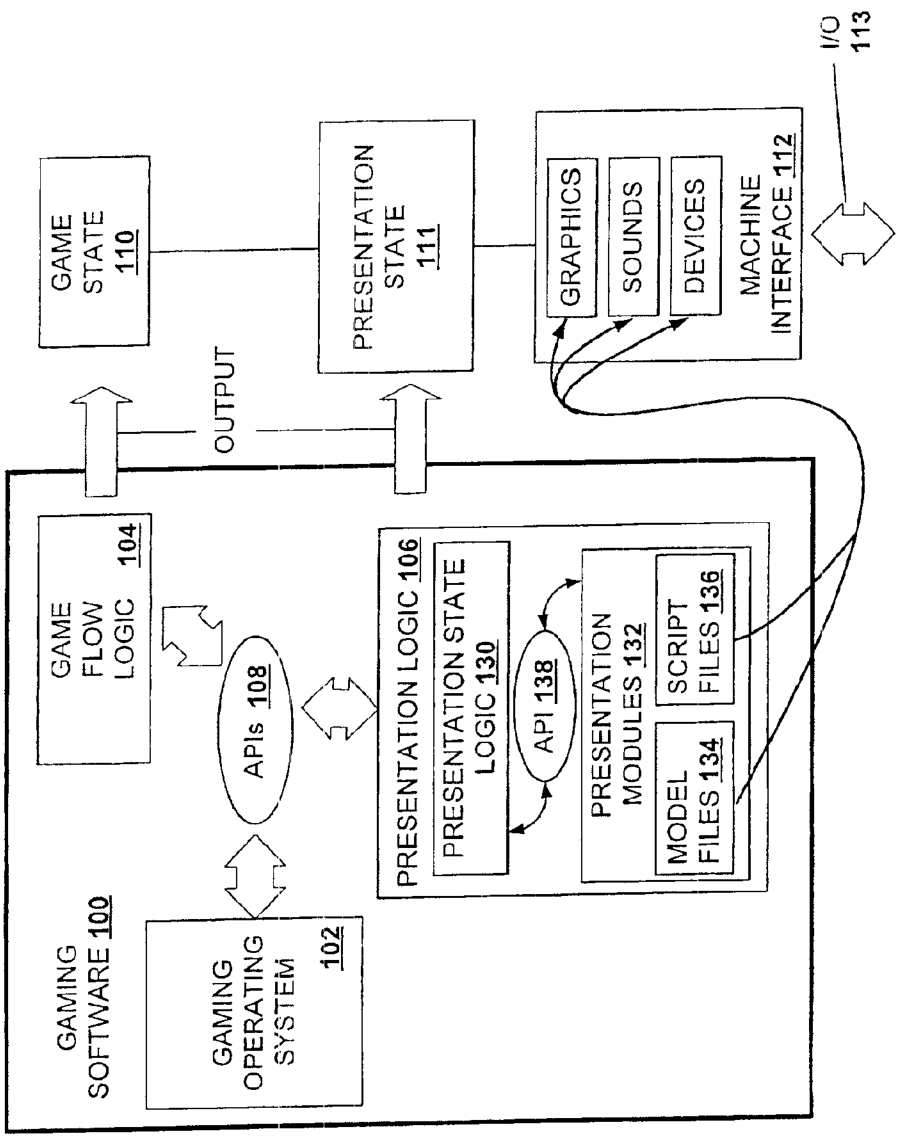

FIGS. 1A and 1B are block diagrams of a gaming machine software architecture providing gaming software 100 for generating a game of chance 125 on a gaming machine for one embodiment of the present invention. The presentation logic 106 may be used to generate graphical output, audio output and gaming device output for presenting the game of chance 125 on the gaming machine. The presentation logic 106 (see FIG. 1B) may be decoupled into two parts: presentation state logic 130 and presentation module logic 132. The presentation state logic 130 is used to determine what graphical components, sound patterns and gaming devices are used to present a game play on the gaming machine as a function of time. The presentation modules 132 may be used to describe, in a modular manner, particular implementations of graphical components, sound patterns and gaming devices that are used to present the game play to a game player playing the gaming machine. The presentation state logic 130 and the presentation modules 132 are generally decoupled from one another and may communicate via one or more APIs 138.

The present invention provides: 1) an input and format structure for presentation modules that allow animation sequences and other components of the game outcome presentation to be easily modified and 2) a modular software architecture that allows one presentation module to be exchanged with another presentation module. As an example, in response to a touch screen input button being depressed on the display screen of a gaming machine, the presentation state logic 130 may determine that an animation of the input button is required. The presentation state logic 130 may communicate, via APIs, 138 with one of the presentation modules 132 and request the presentation module to generate an animation of the input button. Many different animation sequences may be used to animate the button. Thus, in one example, the presentation state logic 130 may command a first presentation module to generate a first animation sequence, which shows an input button being depressed. In another case, the presentation state logic 130 may instead command a second presentation module to generate an animation sequence, which shows an input button being depressed differently than the input button animated in the first presentation module. Details of the presentation modules and their interactions with the other gaming software components are described in the following paragraphs.

The gaming machine software architecture provides gaming software 100 that is divided into a plurality of gaming software modules. The gaming software modules may communicate with one another via application program interfaces. The logical functions performed in each gaming software module and the application program interfaces used to communicate with each gaming software module may be defined in many different ways. Thus, the examples of gaming software modules and the examples of application program interfaces in the present invention are presented for illustrative purposes only and the present invention is not limited to the gaming software modules and application program interfaces described herein.

In general, APIs let application programmers use functions of a software module without having to directly keep track of all the logic details within the software module used to perform the functions. Thus, the inner working of a software module with a well-defined API may be opaque or a "black box" to the application programmer. However, with knowledge of the API, the application programmer knows that a particular output or set of outputs of the software module, which are defined by the API, may be obtained by specifying an input or set of inputs specified by the API.

Typically, APIs describe all of key transactions and associated processing necessary to perform a particular function. For example, functions of a particular presentation module, such as animating a button being depressed, may be described as part of an API for the presentation module. The APIs 138 for the presentation modules 132 may be defined in definition files installed with the game 125. An API may be considered analogous to a device driver in that it provides a way for an application to use a hardware subsystem without having to know every detail of the hardware's operation. Using a well-defined APIs, the logic functions of various gaming software modules maybe decoupled.

In FIGS. 1A and 1B, three gaming software modules, a gaming Operating System (OS) 102, a presentation logic module 106 and a game flow logic module 106 used to present a game of chance 125 on a gaming machine are shown. The gaming operating system 102, the presentation logic module 106 and the game flow logic module 104 may be decoupled from one another and may communicate with one another via a number of application program interfaces 108. The gaming OS 102 may load different combination of game flow logic modules 104 and presentation logic modules 106 to play different games of chance. For instance, to play two different games of chance, the game OS 102 may load a first game flow logic module and a first presentation logic module to enable play of a first game and then may load a second presentation logic module and use it with the first game flow logic module to enable play of a second game. As another example, to play two different games of chance, the game OS 102 may load a first game flow logic module and a first presentation logic module to enable play of a first game and then may load a second game flow logic module and a second presentation logic module to enable play of a second game. Details of the APIs 108 and the gaming software 100 including the Game OS 102, the game flow logic 104 and the presentation logic 106, are described in Co-pending U.S. application Ser. No. 10/040,739, filed on Jan. 3, 2002, by LeMay et al, titled, "Game Development Architecture that Decouples the Game Logic from the Graphics Logic," which is incorporated herein in its entirety and for all purposes.

The Gaming OS 102 comprises logic for core machine-wide functionality. It may control the mainline flow as well as critical information such as meters, money, device status, tilts and configuration used to play a game of chance on a gaming machine. Further, it may be used to load and unload gaming software modules, such as the game flow logic 104 and the presentation logic 106, from a mass storage device on the gaming machine into RAM for execution as processes on the gaming machine. The gaming OS 102 may also maintain a directory structure, monitor the status of processes and schedule the processes for execution.

The game flow logic module 104 comprises the logic and the state machine to drive the game 125. The game flow logic may include: 1) logic for generating a game flow comprising a sequence of game states, 2) logic for setting configuration parameters on the gaming machine, 3) logic for storing critical information to a nonvolatile memory device on the gaming machine and 4) logic for communicating with other gaming software modules via one or more APIs. In particular, after game play has been initiated on the gaming machine, the game flow logic may determine a game outcome and may generate a number of game states used in presenting the game outcome to a player on the gaming machine.

In general, gaming machines include hardware and methods for recovering from operational abnormalities such as power failures, device failures and tilts. Thus, the gaming machine software logic and the game flow logic 104 may be designed to generate a series of game states where critical game data generated during each game state is stored in a non-volatile memory device. The gaming machine does not advance to the next game state in the sequence of game states used to present a game 125 until it is confirmed that the critical game data for the current game state has been stored in the non-volatile memory device. The game OS 102 may verify that the critical game data generated during each game state has been stored to non-volatile memory. As an example, when the game flow logic module 104 generates an outcome of a game of chance in a game state, such as 110, the gaming flow logic module 104 does not advance to the next logical game state in the game flow, such as 114, until game information regarding the game outcome has been stored to the non-volatile memory device. Since a sequence of game states are generated in the gaming software modules as part of a game flow, the gaming machine is often referred to as a state machine.

In FIG. 1A, a game timeline 120 for a game of chance 125 is shown. A gaming event, such as a player inputting credits into the gaming machine, may start game play 125 on the gaming machine. Another gaming event, such as a conclusion to an award presentation may end the game 122. Between the game start 121 and game end 122, as described above, the game flow logic may generate a sequence of game states, such as 110, 114 and 114, that are used to play the game of chance 125. A few examples of game states may include but are not limited to: 1) determining a game outcome, 2) directing the presentation logic 106 to present the game outcome to player, 3) determining a bonus game outcome, 4) directing the presentation logic 106 to present the bonus game to the player and 5) directing the presentation logic to present an award to the game to the player.

The presentation logic module 106 may produce all of the player display and feedback for a given game of chance 125. Thus, for each game state, the presentation logic 106 may generate a corresponding presentation state (e.g., presentation states 111, 115 and 119 which correspond to game states 110, 114 and 118, respectively) that provides output to the player and allows for certain inputs by the player. In each presentation state, a combination of gaming devices on the gaming machine may be operated in a particular manner as described in the presentation state logic 106. For instance, when game state 110 is an award outcome state, the presentation state 111 may include but are not limited to: 1) animations on one or more display screens on the gaming machine, 2) patterns of lights on various lighting units located on the gaming machine and 3) audio outputs from audio devices located on the gaming machine. Other gaming devices on the gaming machine such as, bonus wheels and mechanical reels, may also be operated during a presentation state.

In general, game presentation may include the operation of one or more gaming devices that are designed to stimulate one or more of player's senses i.e. vision, hearing, touch, smell and even taste. For instance, tactile feed back devices may be used on a gaming machine that provide tactile sensations such as vibrations, warmth and cold. As another example, scent generation devices may be provided that generate certain aromas during a game outcome presentation.

The presentation logic 106 may generate a plurality of presentation substates as part of each presentation state. For instance, the presentation state determined by the presentation state logic in a first game of chance may include a presentation substate for a first animation, a presentation substate for a second animation and a third presentation substate for output on a gaming device that generates tactile sensations. In a second game of chance, the presentation state generated by the presentation state logic may be the same as the first game of chance. However, the presentation substates for the second game of chance may be different. For instance, the presentation substates for the second game of chance may include a presentation substate for an animation and a second presentation substate for output on a gaming device that provides scents.

The number of presentation substates used in a particular presentation may be varied. Thus, a game presentation may be customized by changing the presentation substates used in each presentation state where the presentation substates may generate various presentation components. The presentation substates may be described in the presentation modules 132. Thus, presentation modules describing different presentation substates may be incorporated into a game of chance to change the game outcome presentation while allowing the same presentation substate logic 130 to be re-used.

In addition, the presentation state generated by the presentation logic 106 may allow gaming information for a particular game state to be displayed. For instance, the presentation logic module 106 may receive from the gaming OS 102 gaming information indicating a credit has been deposited in the gaming machine and a command to update the displays. After receiving the information indicating the credit has been deposited, the presentation logic 106 may update a credit meter display on the display screen to reflect the additional credit added to the gaming machine.

The gaming devices operated in each presentation state and presentation substate comprise a machine interface that allows the player to receive gaming information from the gaming machine and to input information into the gaming machine. As the presentation states change, the machine interface, such as 112, 116 and 120, may change and different I/O events, such as 113, 117, 121, may be possible. For instance, when a player deposits credits into the gaming machine, a number touch screen buttons may be activated for the machine interface 112 allowing a player to make a wager and start a game. Thus, I/O 113 may include but is not limited to 1) the player touching a touch screen button to make a wager for the game 125, 2) the player touching a touch screen button to make a wager and start the game at the same time and 3) the player viewing the credits available for a wager. After making a wager and starting the game using machine interface 112, in game state 114, the player may be presented with a game outcome presentation using machine interface 116. The I/O 117 on the machine interface 116 may include output of various animations, sounds and light patterns. However, for machine interface 116, player input devices, such as touch screen buttons, may not be enabled.

The presentation components of a given presentation state may include but are not limited to graphical components, sound components, scent components, tactile feedback components and gaming device components to be activated on the machine interface 112. For example, presentation state 111 may include the following presentation components: 1) animate input button, 2) animate reels, 3) play sound A for 2 seconds and then play sound B for 1 second, 4) flash light pattern A for two seconds on lighting device A and 5) spin bonus wheel. The presentation modules 132 may be used to specify an implementation of one or more presentation components used on the machine interface for a given presentation state such as the presentation state 111 described above. Further, the presentation modules may be parameterized to allow some output of the presentation module to be easily changed.

Some examples of presentation modules that implement presentation components are described as follows. A presentation module may be designed to generate an animation sequence of a spinning reel, which is displayed on a display screen on the machine interface 112. The presentation module may include a 3-D model of a reel (see FIG. 4, for details of 3-D modeling) stored as a model file 134. A series of methods stored in one of the script files 136 may be used to generate and control the animation of the reel. For instance, the methods may direct the reel to rotate, change size and translate around the screen. The methods may be parameterized (see FIG. 3) to enable a game developer to easily change aspects of the animation. For example, numerical inputs to the methods in the script file that operate on the reel may be used to change a rate of rotation of the reel, the size of the reel and its position on the screen. An API which allows the presentation logic 130 to activate the animation sequence in the presentation module may be stored in a definition file (not shown).

As another example of a presentation module, a presentation module may be designed to generate an audio sequence for a game outcome presentation on the machine interface 112. The audio sequence may be output on one or more audio devices on the gaming machine. The presentation module may include one or more model files comprising one or more sound files and a script file with a series of methods that control output of the sounds in the sound files. The methods may be parameterized to allow a game developer to easily change aspects of the audio sequence. For instance, the methods may include inputs enabling a game developer to change a length of a time a sound in a sound file is played, a volume of the sound and an output device for the sound. An API which allows the presentation logic 130 to activate the audio sequence in the presentation module may be stored in a definition file (not shown).

In yet another example of a presentation module, a presentation module may be designed to generate an activation sequence for a gaming device, such as a mechanical bonus wheel or a light panel, used in a game outcome presentation or a bonus game outcome presentation on the machine interface 112. The presentation module may include a model file with one or more device drivers for the gaming device and a script file with a series of methods that control the activation of the gaming device via the device drivers. The device drivers model the behavior of the gaming device. Again, the methods may be parameterized to allow a game developer to easily change aspects of the activation sequence for the gaming device. For instance, for a bonus wheel, the methods may include inputs enabling a game developer to change a rate at which the bonus wheel spins, a length of time the wheel spins and a final position of the wheel. As another example, for a light panel, the methods may include inputs enabling a game developer to change a length of times the panel is activated and a light pattern for the light panel. An API which allows the presentation logic 130 to activate the activation sequence in the presentation module may be stored in a definition file (not shown).

When decoupled from the game flow logic 104, the presentation logic 106 makes no assumptions about game flow which means it does not assume the order of states or the logic that will be needed to determine the next state. The presentation logic 106 may, however, control flow by making the game flow logic 104 wait for the current presentation state (e.g., animation, audio output, etc.) to complete. Thus, for some game states, the game flow logic 104 may not advance to the next game state in the game flow until, it receives an acknowledgement from the presentation logic 106 that a current presentation sequence has been completed. Since the presentation modules 132 may be used to generate presentation sequences, logic for notifying the presentation state logic 130 that a presentation sequence generated by a presentation module is complete may be included in one of the script files of the presentation module.

When the gaming software architecture provides a plurality of gaming software modules that communicate via well-defined application program interfaces, gaming software developers may independently develop gaming software modules that are compatible with the defined application program interface without a direct knowledge of the logic used in related gaming software modules. For instance, a single game flow logic module 104 may be used with many different types of presentation logic modules 106 to generate different game themes and styles. Thus, with knowledge of the game flow logic APIs and gaming OS logic APIs, the developer may develop a game presentation without direct knowledge of the logic within the game flow logic module 104 and the gaming OS 102. The presentation modules 132 further decouple the game development process. With knowledge of the presentation logic APIs 138, a game developer may develop a presentation component, such as an animation sequence, using a presentation module without the direct knowledge of the presentation state logic 130 that is used to generate a presentation state requiring the animation sequence. Details of developing presentation components that may be applied with the present invention are described in co-pending U.S. application Ser. No. 09/910,507, filed Jul. 19, 2001, by Beaulieu et al., and titled "Gaming Method and Gaming Apparatus with In-Game Player Stimulation," which is incorporated herein in its entirety and for all purposes.

An advantage of decoupling the gaming software modules using APIs may be a faster software development and approval process. For instance, when a developer can develop a new game by generating only a new presentation logic module 106, the game development process is faster because much less code has to be written. Also, with presentation state logic 130 decoupled from implementation of the presentation state, the development of the presentation logic module 106 may be even faster because the presentation states for a game may be changed by altering the presentation modules 132 without changing the presentation state logic 130. In addition, if the APIs can be shown to be very fault tolerant (e.g., a particular software module will not produce undetectable erroneous results when given incorrect data via an API), then only new or modified gaming software modules installed on a gaming machine, such as a presentation logic module 106 for a new game, may have to be submitted for approval to a gaming jurisdiction prior to installation on the gaming machine. Previously approved gaming software that may be used in conjunction with new or modified gaming software module to present a game of chance, such as a previously approved game flow logic module 106 or a previously approved gaming OS 102, may not have to be resubmitted for approval. Since the amount of code submitted for approval may be less, the approval process may be streamlined. Currently, since most games installed on gaming machines are monolithic in nature with a single executable, any changes to a game for any reason requires all of the gaming software to be submitted for approval which is usually very time consuming.

Figures 2A, 2B, 2C, 2D, 2E, 2F:
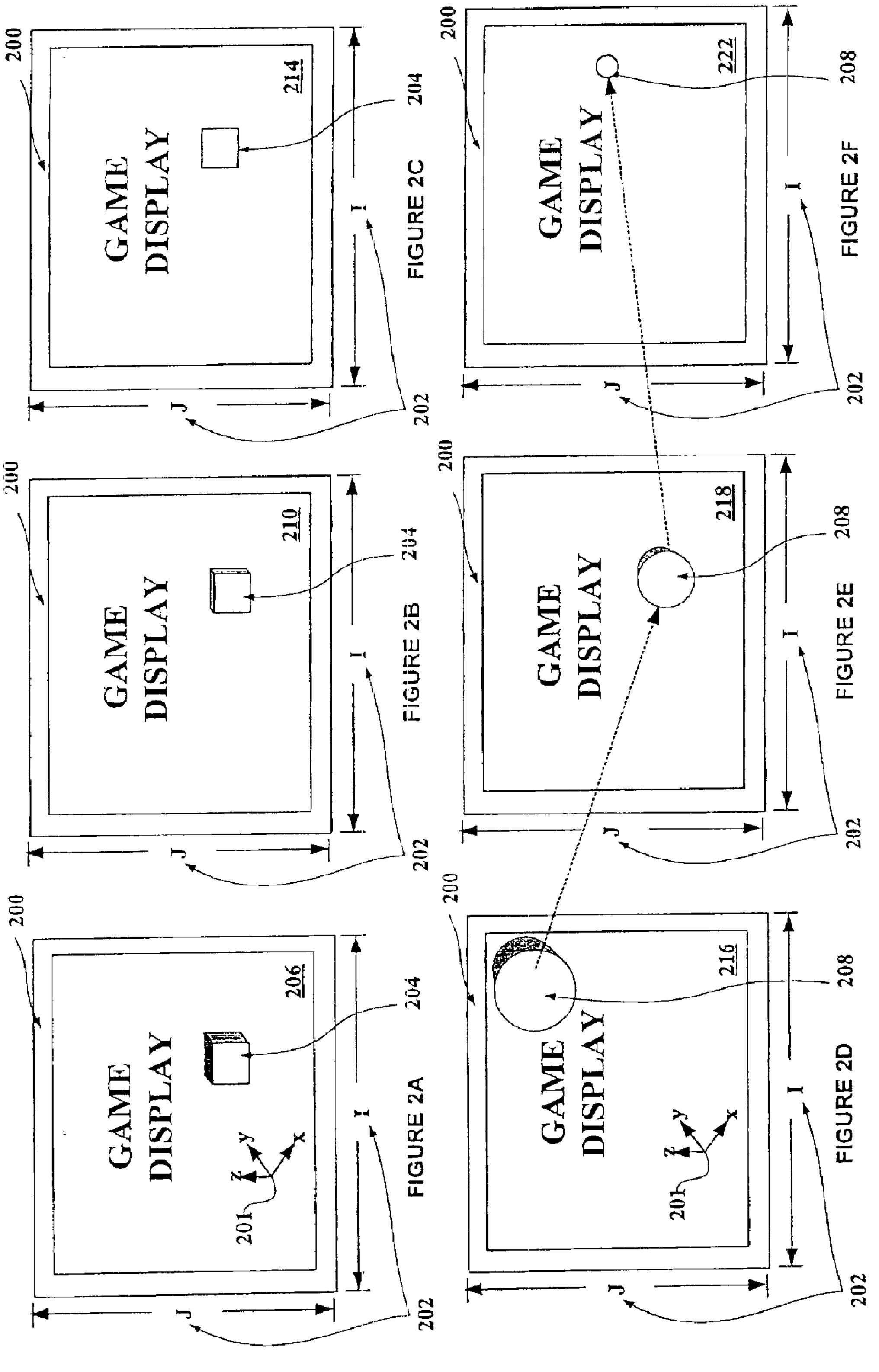
FIGS. 2A–2F are examples of selected video frames from two examples of presentation components generated from a presentation module of the present invention.

FIGS. 2A–2F are examples of selected video frames from two examples of graphical presentation components generated from a presentation module of the present invention. In FIGS. 2A, 2B and 2C, three video frames, 206, 210 and 214, from a game presentation with an animation of an input button 204 being depressed are shown. The video frames may be displayed on a display screen 200 of a gaming machine. The animation of the input button 204 may be controlled by a presentation module as described with respect to FIGS. 1A and 1B. The presentation logic may activate the animation sequence for the input button in response to receiving a touch screen input at the location of the button during game play on the gaming machine.

As described above, the presentation module for the input button animation sequence may include a model file. The model may comprise a geometric description of the input button described in a 3-D coordinate system 201 and other graphical properties used to animate the input button 204 such as a color and surface texture. To display the input button on a display screen on a gaming machine, the 3-D description of the input button is rendered to a 2-D coordinate system, such as coordinates 202. Details of the graphical rendering and animation process are described with respect to FIG. 4.

A script file with a series of parameterized methods may control the animation of the input button being depressed by operating on the model file of the input button. In frames 206, 210 and 214, the input button appears to moving into the screen. The methods in the script file may describe many properties of the animation sequence including but not limited to: 1) a movement pattern of the input button 204 (e.g., a rate at which appears to sink into the screen), 2) a position of the input button 204 on the display screen 200, 3) a size of the input button 204, 4) a color of the input button 204 and 5) a surface texture of the input button 204. The methods in the script file may allow the properties of the animation sequence to change as a function of time. For instance, the size of the input button may change as a function of time or the color of the input button may change as a function of time.

In FIGS. 2D, 2E and 2F, three video frames, 216, 218 and 222, from a game outcome presentation with an animation of a second input button 208 being depressed are shown. In this animation sequence, the model file for the presentation module includes a 3-D geometric description of a cylindrical input button 208 instead of the rectangular input button 204. During the animation sequence, the input button 208 changes position and shrinks in size and changes position as it is being depressed. In video frames 216, 218 and 222. The position of the input button 208 changes in each frame and the size of the input button 208 decreases in each frame. As described above with respect to FIGS. 2A–2C, the methods in the script file may describe many properties of the animation sequence including but not limited to: 1) a movement pattern of the input button 208 (e.g., a rate at which appears to sink into the screen), 2) a position of the input button 208 on the display screen 200, 3) a size of the input button 208, 4) a color of the input button 208 and 5) a surface texture of the input button 208. These animation properties may be parameterized and in some embodiments may be varied as a function of time.

Figure 3:
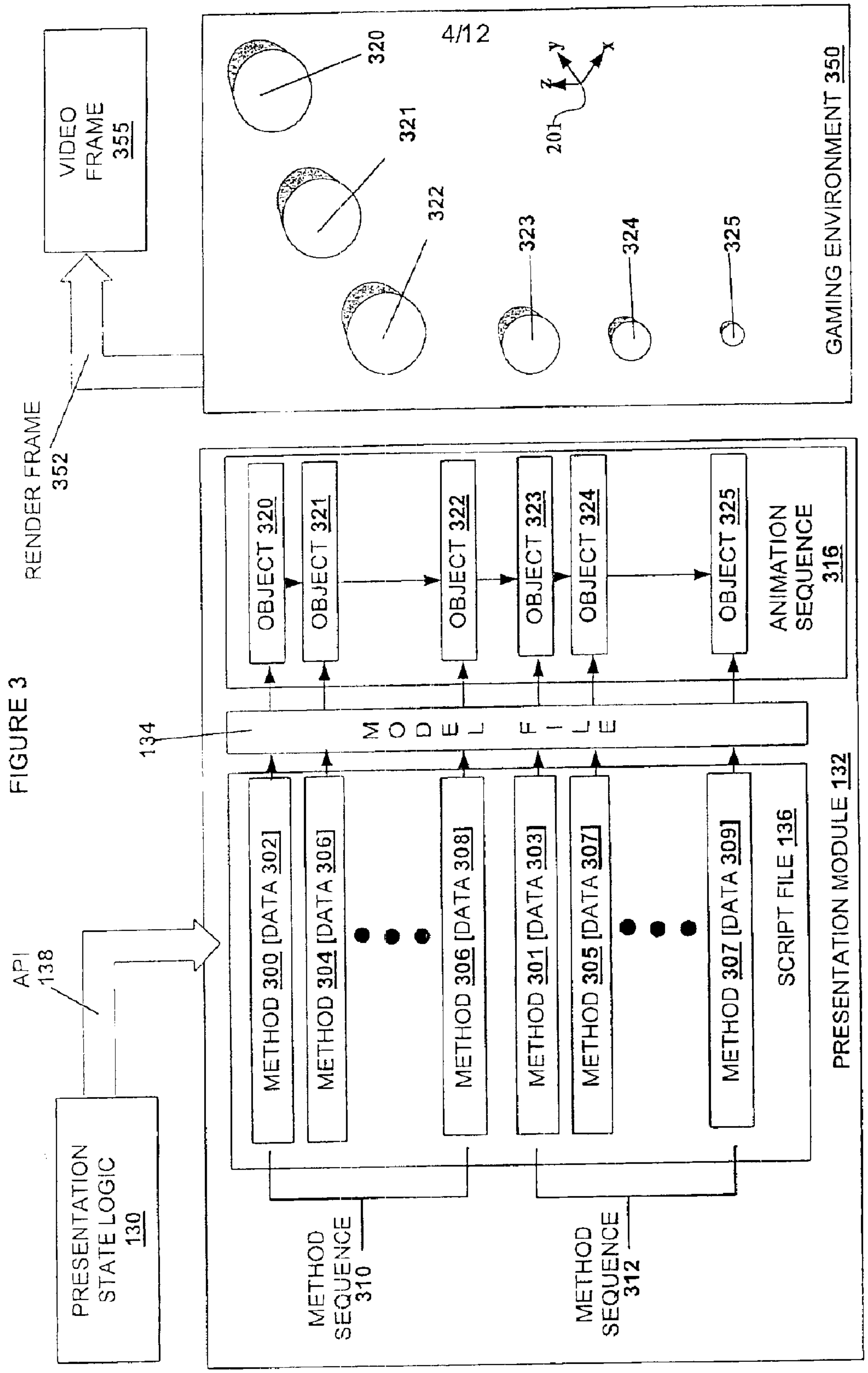
FIG. 3 is a block diagram of a presentation component in a presentation module which is used to manipulate a 3-D object in a model file for one embodiment of the present invention.

FIG. 3 is a block diagram of a presentation component in a presentation module which is used to manipulate a 3-D object in a model file for one embodiment of the present invention. In FIG. 3, an example of a portion of an animation sequence is described for illustrative purposes only. Many different types of animation sequences are possible with the present invention and the present invention is not limited to the example in FIG. 3.

The presentation state logic 130 (see FIGS. 1A and 1B) may send a request to the presentation module 132, via API 138, to generate an animation sequence 316, such as animate input button (see FIGS. 2A–2F). As part of the animation sequence, the presentation module 132 may execute a script file 136 comprising two method sequences 310 and 312. In this example, method sequence 310 is used to move a cylindrical 3-D object, described in a model file 134, in a 3-D gaming environment 350 with coordinates 201. Method sequence 312 is used to scale and move the cylindrical 3-D object, described in the model file 134, in the 3-D gaming environment 350.

A script file 136 may comprise a plurality of method sequences. The method sequences may operate on one or more 3-D objects described in a model file. For instance, a script file may comprise a first method sequence that operates on a first 3-D object and a second method sequence that operates on a second 3-D object.

A method sequence may comprise one or more methods that operate on a 3-D object as well as perform other functions related to the presentation. For method sequence 310, three methods 300, 304 and 306 are listed. In the method sequence, the methods are used to move the 3-D object described in the model file 134. Input data may be required for each method. For instance, methods 300, 304 and 306 may specify a position of the cylindrical input button in the 3-D gaming environment 350. The input data 302, 306, 308, for each method, may include numerical inputs (e.g., x, y and z coordinates) of the position of the 3-D object in the gaming environment. By changing the numerical inputs, 302, 306 and 308 to the methods 300, 304 and 306, the position of 3-D object may be changed in the animation sequence 316 while allowing the methods 300, 304, 306 to be re-used.

For method sequence 312, three methods 301, 305 and 307 are also listed. In the example, the methods are used to move and scale the 3-D object described in the model file 134. Input data may be required for each method. For instance, methods 301, 305 and 307 may specify a position and a size of the cylindrical input button in the 3-D gaming environment 350. The input data 303, 307, 309, for each method, may include numerical inputs (e.g., x, y and z coordinates) of the position of the 3-D object in the gaming environment and a scaling factor such as 100%, 50% or 200%. By changing the numerical inputs, 303, 307 and 309 to the methods 301, 305 and 307, the position and the size of 3-D object may be changed in the animation sequence 316 while allowing the methods 301, 305, 309 to be re-used. For instance, by changing the input data, 303, 307 and 309, to methods 301, 305 and 307, the cylindrical 3-D object may be made to grow in size rather than shrink in size.

The methods in the script file 136 may produce a series of objects that are used as part of the animation sequence 316. For instance, methods 300, 304, 306, 301, 305 and 307 may be used to generate 3-D objects 320, 321, 322, 323, 324 and 325. The position and size of the objects 320, 321, 322, 323, 324 and 325 in 3-D gaming environment 350 are shown in the figure. Each object generated by the methods in the script file 136 in the animation sequence 316 may be rendered 352 to a separate video frame 355. The video frames may be displayed to a display screen on the gaming machine. Details of the rendering process are described with respect to FIG. 4.

When played in sequence, the sequence of video frames may generate an appearance of an animation to a player viewing the display screen of the gaming machine. For instance, when objects, 320, 321, 322, 323, 324 and 325 are each rendered 352 to a separate video frame and the sequence of video frames are displayed on the display screen, the cylindrical function may appear to move and shrink on the display screen as a function of time. Thus, the sequence of frames generated by the presentation module using the method sequences 310 and 312 may be used provide the animation sequence 316. The animation sequence 316 may be used as a presentation component in a game outcome presentation on a gaming machine.

The methods and the input data in a script file 136 may be re-used with a different model file 134. In general, the methods and input data are independent of the 3-D object described in the model file 134. Thus, by changing the 3-D object(s) in the model file 134 a different animation sequence may be generated. For instance, instead of the input button being cylindrical in the animation sequence 316, the input button may be made rectangular (see FIGS. 2A–2F) by changing the model in the model file 134 while reusing the methods 300, 304, 306, 301, 305 and 307 with their respective input data. The re-use of methods, input data and the exchangeability of model files may simplify and speed-up the design process of game outcome presentation.

Details of the script file and examples of some of the methods that may be incorporated in a script file are now described. A file identifier may be used to identify the script file 134 as part of a presentation module 132. For instance, the same keywords, such as "//AVP_SCRIPT_FILE 1.0," may be present as the first line in the file 136 to properly identify it.

The base unit of the script file is may be called the method sequence. A string may be provided for each method sequence to identify it among other method sequences within the script file 132. Each named method sequence within a file will typically have a unique name. For instance, method sequence 310 may be called, "move button" and method sequence 312 may be called "scale/move button." The string may be placed before the list of methods defining the method sequence i.e. "move button" may be placed before method 300 in the script file 136. The list below describes some examples of the methods that may be used to configure a method sequence. The methods and their respective inputs are described for illustrative purposes only. The present invention is not limited to these methods and their input formats.

loopSequence (integer loop_count)

The loopSequence method indicates the number of times the method sequence may be looped. loop_count is an input value for the method. The integer value may be used to indicate the number of times the method sequence may loop before it is completed. When the value is set to −1, the method sequence will loop infinitely.

setPlayBackwards (string backwards)

This method may be used to configure the direction that an animation may be played back. The animation may be played forwards or backwards. backwards is an input parameter that may be set to true if the animation is to be played backwards, or false if the animation is to be played forwards.

postEvent (string sequence_event, integer start_time)

The postEvent method may be used to configure a sequence event that may be posted at the specified time in the sequence. The sequence event may be sent to the gaming operating system (see FIGS. 1A and 1B) via an API and may be used to convey gaming information about the one or more method sequences being executed. For instance, a sequence event may include gaming information indicating an animation sequence has been completed. sequence_event may be string that describes the sequence event that is posted. start_time may be used to set the elapsed time within the method sequence when the event is to be posted. Details of sequence events are described in co-pending U.S. application Ser. No. 10/040,239, filed on Jan. 3, 2002, by LeMay et al, titled, "Game Development Architecture that Decouples the Game Logic from the Graphics Logic," incorporated previously herein.

postEvent (string sequence__event__received, string sequence__event__to__post)

The postEvent method may be used to configure a sequence event that should be posted in response to receiving another sequence event. A sequence__even__recieved string may describe the sequence event received that triggers the sequence__event__to__post to be posted. A Sequence__event__to__post may be a string that describes the sequence event to post in response to receiving the sequence event__received. A start__time may be used to set the elapsed time within the sequence when the event may be posted.

stopEvent (string sequence__event)

The stopEvent method may be used to indicate a sequence event the method sequence may stop on. If the method sequence can be stopped from multiple sequence events then this method may be called multiple times with different events. sequence__event may be a string that describes the sequence event that may be used to stop the sequence.

triggerEvent (string sequence__event)

The triggerEvent method may be used to indicate the sequence event the method sequence may start on. If the method sequence may be started from multiple sequence events then this method may be called multiple times with different events. sequence__event may be a string that describes the sequence event that may be used to start the method sequence. The event methods described above may be used as part of an API used to control the activation and de-activation of method sequences.

As described above, the sequence operations may be used to generate animations of objects with various properties. The properties may include but are not limited to: 1) position, 2) rotation, 3) orientation, 4) scale, 5) brightness, 6) saturation and 7) transparency. Some of these properties in the context of 3-D graphics are described with respect to FIG. 4. Various methods may be defined that allow the user to specify one or more of these properties to manipulate over a length of time. Methods may also be defined where a user may specify a type of interpolation to use between frames. The list below provides examples of methods that may be used in a script file as part of method sequences that are used to generate a graphical presentation component.

setDuration (integer animation__duration)

The setDuration method may be used to set a duration of an animation in milliseconds. The duration of all frames with a specified of a specific type may be set with this method. An animation__duration may represent the total duration that the frames of the specific type will take. Each frame's duration may be calculated by dividing the animation duration by the total number of frames of the specified type.

setFrame (string data, frame__duration)

The setFrame method may be used to configure the next frame of in the method sequence. Successive calls to this method may add new a new frame after the last one. data may be a string that contains the information required to modify a specified 3-D object in a comma separated format. All data values may be assumed to be floats. The data string may include but is not limited to: 1) Position which requires three float values that represent x, y and z respectively, 2) Rotation which requires three float values that represent x, y and z respectively, 3) Orientation which requires four float values that represent theta, x, y and z respectively, 4) Scale which requires three float values that represent x, y and z respectively and 5) Brightness requires one float with a range of −1.0f to 1.0f, 6) Saturation requires one float with a range of 0.0f to 1.0f and 7) Transparency requires one float with a range of 0.0f to 1.0f. A frame__duration may be used to specify the duration of the frame in milliseconds setInitialFrame (integer frame__offset)

This method may be used to set the initial frame of the specified method sequence. A frame__offset parameter may be used to determine what frame of the specified type is to be set as the initial frame. Valid values for this parameter may range from 0 to (number of frames—1). By default this value is the first frame.

setInterpolation (string interpolation__type)

This method may be used to set the type of interpolation that may be used when then animation sequence advances frames to a next frame in the frame sequence. An interpolation__type may be a value that is used to determine what type of interpolation may be used as the animation progresses. A few example of values for interpolation__type are listed below. A "LINEAR" value combines the current frame with the next frame using the elapsed time of the current frame as a weighing factor to determine the combined frame. A "STEP" value may change the values to the next frame when the current frame has expired without interpolating between frames.

setLastFrame (integer frame__offset)

This method may be used to set the last frame of the specified method sequence. A frame__offset parameter may be used to determines what frame of the specified type is to be set as the last frame. Valid values for this parameter can range from 0 to (number of frames—1). By default this value is the last frame added.

Mesh animation methods may be used to determine how frames within a mesh animation are combined and how multiple mesh animations may be combined to create a final mesh used to draw an animation in various method sequences. Each mesh may have multiple active mesh animations with each animation consisting of several mesh frames. An active mesh animation may have only two active frames, the current frame and the next frame. Based on the interpolation type chosen, the current and next mesh frames may combined or the frames may step from the current to next frame. The list below describes the methods that may be used to generate method sequences involving mesh animations.

resizeAnimation Weights (string mesh__animation__name, integer size, string duration)

The resize method may be used to indicate how many animation weight frames to create and the duration of each frame. A mesh__animation__name nay be a name of the corresponding mesh animation in the method sequence being configured. Each mesh animation is created with a name. A size parameter may indicate a number of frames that may be created. A duration parameter may be string that may be set to INDIVIDUAL__FRAME__DURATION. INDIVIDUAL__FRAME__DURATION allows the user to specify each frame's duration when the frame is configured with the setFrameAnimation Weight method, or an integer value may be specified that represents the total duration that the frames of this type should take in milliseconds. Each frame's duration is calculated by dividing the duration by the total number of frames.

resizeMeshFrame Weights (string mesh__animation__name, integer size, string duration)

The resize method may be used to indicate how many meshframe weight frames to create and the duration of each frame. A mesh__animation__name parameter may be a name of the corresponding mesh animation in the method sequence being configured. Each mesh animation may have to be created with a name. A size parameter may indicate a number of frames that may be created. A duration parameter may be string that may be set to INDIVIDUAL__FRAME__DURATION. INDIVIDUAL__FRAME__DURATION allows the user to specify each frame's duration when the frame is configured with the setFrameAnimation Weight method, or an integer value may be specified that represents the total duration that the frames of this type should take in milliseconds. Each frame's duration is calculated by dividing the duration by the total number of frames.

setInitialFrameAnimation Weight (string mesh__animation__name, integer initial__frame)

This method may be used to set the initial frame to use in the list of animation weights for the specified mesh animation. A mesh__animation__name parameter may be a name of the corresponding mesh animation in the method sequence being configured. Each mesh animation may have to be created with a name. An initial__frame parameter may be used to determine what frame is to be set as the initial frame. Valid values for this parameter may range from 0 to (size—1). Where size is the value passed into the resizeAnimation Weights method and is a number of frames.

setInitialFrameMeshFrame Weight (string mesh__animation__name, integer initial__frame)

This method may be used to set the initial frame to use in the list of mesh frame weights for the specified mesh animation. A mesh__animation__name may be a name of the corresponding mesh animation in the method sequence being configured. Each mesh animation may have to be created with a name. An initial__frame may be a parameter that determines what frame is to be set as the initial frame. Valid values for this parameter may range from 0 to (size—1). Where size is the value passed into the resizeMeshFrame Weights method and may represent a number of frames.

setLastFrameAnimation Weight (string mesh__animation__name, integer last__frame)

This method may be used to set the last frame to use in the list of animation weights for the specified mesh animation. A mesh__animation__name may be a name of the corresponding mesh animation in the method sequence being configured. Each mesh animation may have to be created with a name. A last__frame parameter may determine what frame is to be set as the last frame. Valid values for this parameter may range from 0 to (size—1) where size is the value passed into the resizeAnimation Weights method and is a number of frames.

setLastFrameMeshFrame Weight (string mesh animation__name, integer last__frame)

This method may be used to set the last frame to use in the list of mesh frame weights for the specified mesh animation. A mesh__animation__name may be a name of the corresponding mesh animation in the method sequence being configured. Each mesh animation may have to be created with a name. A last__frame parameter may determines what frame is to be set as the last frame. Valid values for this parameter may range from 0 to (size—1) where size is the value passed into the resizeMeshFrame Weights method and is a number of frames.

setFrameAnimation Weight (string mesh__animation__name, integer frame__index, float weight, string duration)

The setFrameAnimation Weight method may be used to configure a specific frame. Once the number of frames has been set with the resizeAnimation Weight method, each frame may be configured with a call to this method. A mesh__animation__name is a name of the corresponding mesh animation in the sequence operation being configured. Each mesh animation may have to be created with a name. A frame__index parameter may be used to determine what frame is to be configured. Valid values for this parameter may range from 0 to (size—1) where size is the value passed into the resizeAnimation Weights method and is a number of frames. A weight parameter may be used to indicates the animation's weight for the specified frame. A duration parameter is used to determine the duration of the frame which may be a length of time in milliseconds.

setFrameMeshFrame Weight (string mesh__animation__name, integer frame__index, integer mesh frame__offset, float weight, string duration)

The setFrameMeshFrame Weight method may be used to configure a weight of a mesh frame within a mesh animation. Once the number of frames has been set with the resizeMeshFrame Weight method, each frame may be configured with a call to this method. mesh__animation__name may b a name of the corresponding mesh animation in the method sequence being configured. Each mesh animation may have to be created with a name. A frame__index parameter may be used to determine what frame is to be configured. Valid values for this parameter can range from 0 to (size—1) where size is the value passed into the resizeAnimation Weights method and is a number of frames. A mesh__frame__offset parameter may be used to determines on what mesh frame within the mesh animation the weight parameter is applied. A weight parameter may be used to indicate the mesh frame's weight for the specified frame. A duration parameter may be used to set the duration of the frame in milliseconds.

setDurationAnimation Weight (string mesh__animation__name, integer duration)

The setDurationAnimation Weight method may be used to set the duration of the animation in milliseconds. This means that the duration of all frames for the specified mesh animation are set. A mesh__animation__name may be a name of the corresponding mesh animation in the method sequence being configured. Each mesh animation may have to be created with a name. A duration may be used to represent the total duration that the frames of this type may take.

setDurationAnimation Weight (string mesh__animation__name, integer duration)

The setDurationAnimation Weight method may be used to set the duration of the animation in milliseconds. This means that the duration of all frames for the specified mesh animation are set. A mesh__animation__name is a name of the corresponding mesh animation in the object being configured. Each mesh animation may have to be created with a name. A duration represents the total duration that the frames of this type may take.

setDurationMeshFrame Weight (string mesh__animation__name, integer duration)

The setDurationMeshFrame Weight method may be used to set the duration of the mesh frame's animation in milliseconds. This means that the duration of all frames for the specified mesh frame animation are set. A mesh__animation__name is a name of the corresponding mesh animation in the method sequence being configured. Each mesh animation may have to be created with a name. A duration parameter represents the total duration that the frames of this type may take setInterpolationAnimation Weight (string mesh__animation__name, string interpolation__type)

This method sets the interpolation type for the specified animation weight. A mesh__animation__name is a name of the corresponding mesh animation in the method sequence being configured. Each mesh animation may have to be created with a name. An interpolation_type is a value that is used to determine what type of interpolation may be used as the animation progresses. Some values for this parameter are listed below with a description. A "LINEAR" value may be used to combines the current frame with the next frame using the elapsed time of the current frame as a weighing factor to determine the combined frame. A "STEP" value may be used to advance to the next frame when the current frame has expired without interpolation.

setInterpolationMeshFrame Weight (string mesh_animation_name, string interpolation_type)

This method may be used to set the interpolation type for the combination of meshframes in the specified mesh animation. A mesh_animation_name is a name of the corresponding mesh animation in the method sequence being configured. Each mesh animation may have to be created with a name. An interpolation_type is a value that is used to determine what type of interpolation may be used as the animation progresses. Some values for this parameter are listed below with a description. A "LINEAR" value may be used to combines the current frame with the next frame using the elapsed time of the current frame as a weighing factor to determine the combined frame. A "STEP" value may be used to advance to the next frame when the current frame has expired without interpolation.

setPlayBackwards (string backwards)

This method may be used to configure the direction that the animation may be played back. The animation can be played forwards or backwards. A backwards parameter may be set to true if the animation should be played backwards, or false if it should play forwards.

Many possible methods may be used with the present invention that may be used in various sequence operations. A few examples of methods may include but are not limited to: 1) texture animation methods that control the texture of an object, 2) camera animation methods that control the view of a particular object (see FIG. 4) to be rendered in a frame, 3) lighting methods that control the lighting properties of rendered objects, 4) material animation methods that control the material properties of objects such as there reflectivity and absorptivity.

The following example shows a method sequence that configures a property animation to move a 3-D object along a path of three points over the duration of 300 ms. The example also configures a start event and an event to post when the method sequence is complete. The method sequence may be used in a script file 136 as part of a presentation module.

```
File Identifier
triggerEvent ("StartExampleSequence1");
postEvent ("PositionExampleSequence1Completed",
  300);
Position
setInterpolation (LINEAR);
setDuration (300);
setFrame ("0.0f, 0.0f, –3.0f");
setFrame ("0.2f, 0.0f, –3.0f");
setFrame ("0.5f, –0.3f, –3.0f");
```

The file starts with a file identifier which identifies it as a script file. The triggerEvent method defines a sequence event that may be used to end the animation sequence described in the file. The postEvent method defines a sequence event to post when the animation sequence is completed. The sequence event is posted after 300 milliseconds. "Position" is a name of a method sequence defined in the file. The method sequence may be used to manipulate a 3-D object's position. The setInterpolation method is used to set linear interpolation between frames. The setDuration method is used to set the duration of all the position frames. This time is divided by the total number of frames to determine each frame's duration. The three setFrame methods are used to set the position of the object in each frame. As described above, the position sequence operation may be used to operate on many different models that may be described in a model file used with the script file defined above. Further, a user may easily change the position of the object in an animation sequence by changing the parameters in the setFrame method which define the position of the object.

The script file, described above, in the previous paragraph was shown in a text format. The present invention is not limited to text files. The script files, model files and any additional files used in the present invention can be prepared for use in pre-tokenized and binary formats. A pre-tokenized file is a text file that may need to be parsed in some manner prior to use. The text and binary files may also be compiled to form binary files as well as parsed text files.

In previous paragraphs, methods have been described to manipulate graphical objects described in model files. The present invention as previously described with respect to FIGS. 1A and 1B may also be used to manipulate sounds and gaming devices provided by the gaming machine interface. In these cases, method sequences and methods may be defined that operate on sound files and abstractions of gaming devices such as a device driver. These method sequences may use parameterized methods for manipulating sounds and gaming devices.

Figure 4:
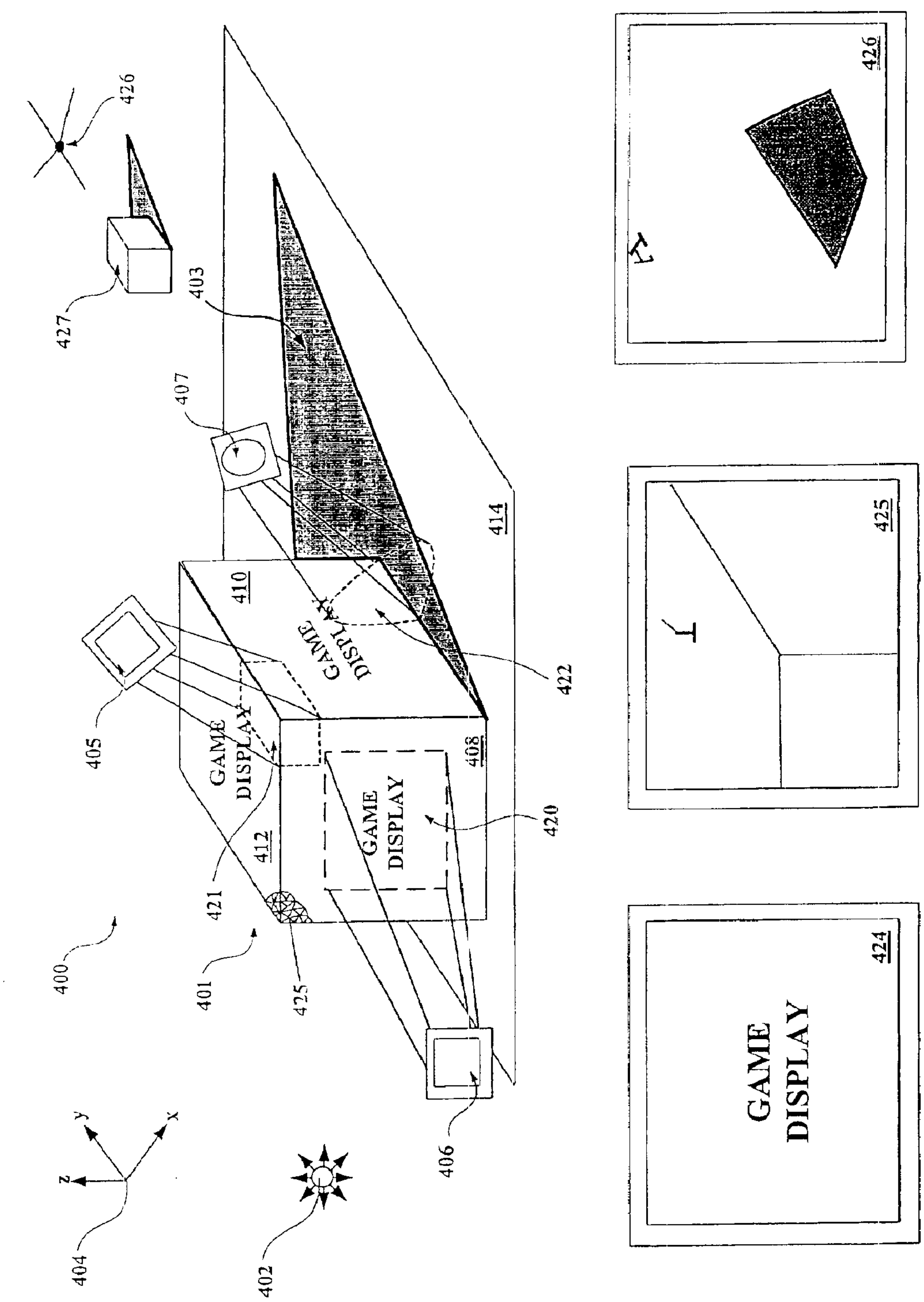
FIG. 4 is a perspective drawing of a 3-D virtual gaming environment implemented on a gaming machine for one embodiment of this invention.

FIG. 4 is a perspective drawing of a 3-D virtual gaming environment implemented on a gaming machine for one embodiment of this invention. Various 3-D graphics methods and properties are discussed that may be manipulated using method sequences as described with respect to FIG. 3. The 3-D virtual gaming environment may be used by the master gaming controller on the gaming machine to present a game of chance. The game of chance played on the gaming machine may include: 1) a wager selected by a player playing a game on the gaming machine, 2) an initiation of the game of chance on the gaming machine by the player, 3) a determination of an outcome for the game of chance by the gaming machine and 4) a presentation on the gaming machine of the game outcome to the player.

To utilize a virtual 3-D gaming environment for a game presentation or other gaming activities on a gaming machine, a 2-D view of the virtual 3-D gaming environment is rendered. The 2-D view captures some portion of the surfaces modeled in the virtual 3-D gaming environment. The captured surfaces define a 3-D object in the 3-D gaming environment. The captured surfaces in 2-D view are defined in the 3-dimensional coordinates of the virtual 3-D gaming environment and converted to a 2-dimensional coordinate system during the capturing process. As part of a game presentation, the 2-D view may be presented as a video frame on a display screen on the gaming machine. In some ways, the two-dimensional view is analogous to a photograph of a physical 3-D environment taken by a camera where the photograph captures a portion of the physical 3-D surfaces existing in the physical 3-D environment. However, the photograph from a camera is not strictly analogous to a 2-D view rendered from a virtual 3-D gaming environment because many graphical manipulation techniques may be applied in a virtual 3-D gaming environment that are not available with an actual camera.

In the present invention, the 2-D view is generated from a viewpoint within the virtual 3-D gaming environment. The viewpoint is a main factor in determining what surfaces of the 3-D gaming environment defining a 3-D object are captured in the 2-D view. Since information about the 3-D gaming environment is stored on the gaming machine, the viewpoint may be altered to generate new 2-D views of objects within the 3-D gaming environment. For instance, in one frame, a 2-D view of an object modeled in the 3-D gaming environment, such as a front side of a building (e.g. the viewpoint captures the front side of a building), may be generated using a first viewpoint. In another frame, a 2-D view of the same object may be generated from another viewpoint (e.g. the backside of the building).

Returning to FIG. 4, the 3-D gaming environment 400 includes three objects: 1) a rectangular box 401 on top of, 2) a plane 414 and 3) a second box 426. The box 401, box 427 and plane 414 are defined in a 3-dimensional rectangular coordinate space 404. Typically, surfaces of the objects in the gaming environment are defined using a plurality of surface elements. The surface elements may comprise different shapes, such as different types of polygons that are well known in the 3-D graphical arts. For example, the objects in the present information may be defined in a manner to be compatible with one or more graphics standards such as Open Graphics Library (OpenGL). Information on OpenGL may be found at www.opengl.org.

In one embodiment, the objects in the gaming environment 400 may be defined by a plurality of triangular elements. As an example, a plurality of triangular surface elements 425 are used to define a portion of the surface 408 and the surface face 412. In another embodiment, the objects in the gaming environment 400, such as box 401 and box 426, may be defined by a plurality of rectangular elements. In yet another embodiment, a combination of different types of polygons, such as triangles and rectangles may be used to describe the different objects in the gaming environment 400. By using an appropriate number of surface elements, such as triangular elements, objects may be made to look round, spherical, tubular or embody any number of combinations of curved surfaces.

Triangles are by the most popular polygon used to define 3-D objects because they are the easiest to deal with. In order to represent a solid object, a polygon of at least three sides is required (e.g. triangle). However, OpenGL supports Quads, points, lines, triangle strips and quad strips and polygons with any number of points. In addition, 3-D models can be represented by a variety of 3-D curves such as NURBs and Bezier Patches.

Each of the surface elements comprising the 3-D virtual gaming environment may be described in a rectangular coordinate system or another appropriate coordinate system, such as spherical coordinates or polar coordinates, as dictated by the application. The 3-D virtual gaming environments of the present invention are not limited to the shapes and elements shown in FIG. 4 or the coordinate system used in FIG. 4 which are shown for illustrative purposes only. Details of 3-D graphical rendering methods that may be used with the present invention are described in "OpenGL Reference Manual: The Official Reference Document to Open GL, Version 1.2," 3rd edition, by Dave Shreiner (editor), OpenGL Architecture Review Board, Addison-Wesley Publishing, Co., 1999, ISBN: 0201657651 and "OpenGL Program Guide: The Official Guide to Learning OpenGL, Version 1.2," 3rd edition, by Mason Woo, Jackie Neider, Tom Davis, Dave Shreiner, OpenGL Architecture Review Board, Addison-Wesley Publishing, Co., 1999, ISBN: 0201604582, which are incorporated herein in their entirety and for all purposes.

Surface textures may be applied to each of the surface elements, such as elements 425, defining the surfaces in the virtual gaming environment 400. The surface textures may allow the 3-D gaming environment to appear more "real" when it is viewed on a display screen on the gaming machine. As an example, colors, textures and reflectance's may be applied to each of the surface elements defining the various objects in the 3-D gaming environment. Millions of different colors may be used to add a realistic "feel" to a given gaming environment. Textures that may be applied include smoothness or surface irregularities such as bumps, craters, lines, bump maps, light maps, reflectance maps and refractance maps or other patterns that may be rendered on each element. The textures may be applied as mathematical models stored as "texture maps" on the gaming machine.

In one embodiment, the "texture map" may be an animated texture. For instance, frames of a movie or another animation may be projected onto a 3-D object in the 3-D gaming environment. These animated textures may be captured in 2-D views presented in video frames on the gaming machine. Multiple animated textures may be used at the same time. Thus, for example, a first movie may be projected onto a first surface in the 3-D gaming environment and a second movie may be projected onto a second surface in the 3-D gaming environment where both movies may be viewed simultaneously.

Material properties of a 3-D surface may describe how the surface reacts to light. These surface properties may include such things as a) a material's ability to absorb different wave-lengths of light, b) a material's ability to reflect different wavelengths of light (reflectance), c) a material's ability to emit certain wavelengths of light such as the tail lights on a car and d) a material's ability to transmit certain wavelengths of light. As an example, reflectance refers to how much light each element reflects. Depending on the reflectance of a surface element other items in the gaming environment may be reflected fuzzily, sharply or not at all. Combinations of color, texture and reflectance may be used to impart an illusion of a particular quality to an object, such as hard, soft, warm or cold. In present invention, methods may be defined that operate on an object's surface properties. These methods may be used in method sequences in script files as described with respect to FIG. 3.

Some shading methods that are commonly used with 3-D graphics to add texture that may be applied to the present invention include gourand shading and phong shading. Gourand and Phong shading are methods used to hide an object's limited geometry by interpolating between two surfaces with different normals. Further, using Alpha Blending, pixels may be blended together to make an object appear transparent i.e. the object transmits light.

Virtual light sources, such as 402, may be used in the gaming environment to add the appearance of shading and shadows. Shading and shadows are used to add weight and solidity to the rendering of a virtual object. For example, to add solidity to the rectangular box 401, light rays emitted from light source 402 are used to generate a shadow 403 around the rectangular box 401. In one method, ray tracing is used to plot paths of imaginary light rays emitted from an imaginary light source such as 402. These light rays may impact and may reflect off various surfaces affecting the colors assigned to each surface element. In some gaming environments, multiple light sources may be used where the number of lights and the intensity of each light source change with time. Typically, in real time 3D, the light sources do not generate shadows and it is up to the programmer to add shadows manually. As stated earlier, however, the light sources produce shading on objects.

Perspective, which is used to convey the illusion of distance, may be applied to the gaming environment 400 by defining a vanishing point, such as 426. Typically, a single point perspective is used where all of the objects in the scene are rendered to appear as though they will eventually converge at a single point in the distance, e.g. the vanishing point. However, multiple point perspectives may also be employed in 3-D gaming environments of the present invention. Perspective allows objects in the gaming environment appear behind one another. For instance, box 401 and box 427 may be the same size. However, box 427 is made to appear smaller, and hence farther away, to a viewer because it is closer to the vanishing point 426. A 3-D gaming environment may or may not provide perspective correction. Perspective correction is accomplished by transforming points towards the center of the 2-D view screen. The farther away an object is from the viewpoint in 3-D gaming environment, the more it will be transformed into the center of screen.

The present invention is not limited to perspective views or multiple perspective views of the 3-D gaming environment. An orthographic view may be used where 3-D objects rendered in a 2-D view always appear the same size no matter how far away they are in the 3-D gaming environment. The orthographic view is what you would see as a shadow cast from a light source that is infinitely far away (so that the light rays are parallel), while the perspective view comes from a light source that are finitely far away, so that the light rays are diverging. In the present invention, combinations of both perspective and orthographic views may be used. For instance, an orthographic view of a text message may be layered on top of a perspective view of the 3-D gaming environment.

Related to perspective is "depth of field". The depth of field describes an effect where objects that appear closer to a viewer are more in focus and objects that are farther away appear out of focus. Depth of field may be applied renderings of the various objects in the gaming environment 400. Another effect that may be applied to renderings of objects in the gaming environment is "anti-aliasing". Anti-aliasing is used to male lines which are digitally generated as a number of straight segments appear more smooth when rendered on a display screen on the gaming machine. Because the 2D display only takes finite pixel positions, stair stepping occurs on any limes that are not straight up and down, straight across (left and right) or at 45 degrees on the display screen. Stair stepping produces a visually unappealing effect, thus, pixels are added to stair-stepped lines to make this effect less dramatic.

Objects in the gaming environment 401 may appear to be static or dynamic. For instance, the coordinates of box 427 may change with time while the coordinates of box 401 and plane 414 remain fixed. Thus, when rendered on a display screen on a gaming machine, the box 427 may appear to move in the gaming environment 401 relative to the box 401. Many dynamic effects are possible. For instance, box 427 may appear to rotate while remaining in a fixed position or may rotate while also translating to generate an effect of bouncing or tumbling. Further, in the gaming environment, objects may appear to collide with one another. For instance, box 427 may appear to collide with box 401 altering the trajectory of box 427 in the gaming environment. Many digital rendering effects may be applied to the gaming environment of the present invention. The effects described above have been provided for illustrative purposes only.

Standard alpha-numeric text and symbols may be applied to one or more surface elements in the gaming environment 401 to display gaming information to a game player. The alpha-numeric text and symbols may be applied to various surfaces in the gaming environment to generate a plurality of game displays that may be used as part of game outcome presentations viewed on the gaming machine. For instance, game displays may be rendered on each of the 6 six surface faces of box 401 or box 427 and a plurality of game displays may also be rendered on planar surface 414. In the present invention, game displays may be rendered across one or more surfaces of any polyhedron or other object defined in the gaming environment.

The rendered text and symbols allow game outcome presentations to be generated for different games of chance. For instance, a card hand for a poker game or black jack game may be rendered on each of the faces of box 401 such as surfaces 408, 410 and 412. As another example, keno numbers or bingo numbers may be rendered on different faces of boxes 401 and 427. Further, slot displays and pachinko displays for slot and pachinko game outcome presentations may be rendered on different faces of boxes 401 and 427.

Many different combinations of games of chance may be rendered in the gaming environment 400. For instance, a slot display may be rendered on face 408 of box 401, a black jack game display may be rendered on face 410, poker game display may be rendered on face 412, a keno game display may be rendered on a face on the box 401 opposite face 408, a pachinko game display may be rendered on a face on the box 401 opposite 410 and a bingo game display may be rendered on a face on the box 401 opposite face 412. A different combination of game displays may be rendered on the surfaces of box 427. Other games of chance that may be used in the present invention include but are not limited to dice games (e.g. craps), baccarat and roulette.

In the present invention, games of chance are used to denote gaming activities where a game player has made a wager on the outcome of the game of chance. Depending on the game outcome for the game of chance initiated by the player, the wager may be multiplied. The game outcome may proceed solely according to chance, i.e. without any input by the game player or the game player may affect the game outcome according to one or more decisions. For instance, in a video poker game, the game outcome may be determined according to cards held or discarded by the game player. While in a slot game, the game outcome, i.e. the final position of the slot reels, is randomly determined by the gaming machine.

The combinations of games described above may be rendered at the same time in the 3-D gaming environment. A player may play one or more games in a sequential manner. For instance, a player may select one or more games, make a wager for the one or more games and then initiate the one or more games and view game outcome presentations for the one or more games. A player may also play one or more games in a parallel manner. For instance, a player may select one or more games, make a wager for the one or more games, initiate the one or more games. Before the game outcome presentations have been completed for the one or more selected games, the player may select one or more new games, make a wager for the one or more new games and initiate the one or more new games. Details of a parallel game methodology are described in co-pending U.S. application Ser. No. 09/553,437, filed on Apr. 19, 2000, by Brosnan et al. and entitled "Parallel Games on a Gaming Device," which is incorporated in its entirety and for all purposes.

The rendered text and symbols in a game display are not necessarily planar may be rendered in multiple in dimensions in the gaming environment 400. For example, rendered cards may have a finite thickness or raised symbols. The cards may be dealt by hands that are defined as 3 dimensional object models in the 3-D gaming environment 400 and move as the cards are dealt. As another example, a slot display may be rendered as multidimensional reels with symbols that may rotate in the gaming environment 400. As described above, presentation modules of the present invention may be generated to perform some of these graphical object manipulations such rotating slot reel.

A game display for a game outcome presentation may be rendered on a particular surface and may change with time in response to various player inputs. For example, in a poker game, a player may discard and hold various cards while they are playing the game. Thus, the cards in the hand change as the game outcome is rendered in the 3-D gaming environment and some cards (e.g. discarded cards) may appear to leave the gaming environment. As another example, reels on a slot display rendered in the gaming environment may begin to spin in the gaming environment in response to a player pulling a lever or depressing an input button on the physical gaming machine.

Other game features and gaming information may also be rendered in the gaming environment 400. For example, bonus games, promotions, advertising and attraction graphics may also be rendered in the gaming environment. For instance, a casino's logo or a player's face may be rendered in the gaming environment. These additional game features may be integrated into a game outcome presentation on the gaming machine or other operational modes of the gaming machine such as an attract mode.

In another embodiment of the present invention, a virtual person, e.g. a 3-D dimensional model of a portion (e.g., face, hands, face, head and torso, etc.) or all of a human being may be rendered in the 3-D gaming environment. The virtual person may be animated. For the instance, by adjusting parameters of the 3-D dimensional model of the virtual person in a sequence, the virtual person may appear to speak or gesture. The virtual person may be used to explain gaming instructions to a game player or may be used as a component in a game presentation. The virtual person may appear to respond or interact with a user according to inputs into the gaming machine made by the user. For instance, a player may ask the virtual person a particular question via an input mechanism on the gaming machine such as microphone on a gaming machine equipped with voice recognition software. Next, the virtual person may appear to speak a response to the question input by the user. Animated 3-D models for other objects, such as animals or fictional characters, may also be used in the 3-D gaming environment.

After the gaming environment is defined in 3-dimensions, to display a portion of the 3-D gaming environment on a display screen on the gaming machine, a "photograph" of a portion of the gaming environment is generated. The photograph is a 2-dimensional rendering of a portion of the 3-dimensional gaming environment. Transformations between 3-D coordinate systems and 2-D coordinate systems are well known in the graphical arts. The photograph may be taken from a virtual "camera" positioned at a location inside the gaming environment 400. A sequence of photographs taken by the virtual camera in the gaming environment may be considered analogous to filming a movie.

A "photograph" displayed on the display screen of a gaming machine may also a composite of many different photographs. For instance, a composite photograph may be generated from portions of a first photograph generated using an orthographic view and portions of a second photograph generated using a perspective view. The portions of the photographs comprising the composite photograph may be placed on top of one another to provide "layered" effects, may be displayed in a side by side manner to produce a "collage" or combinations thereof.

In another embodiment of the present invention, a photograph may be a blended combination of two different photographs. Using an interpolation scheme of some type, two photographs may be blended in a sequence of photographs to provide a morphing effect where the first photograph appears to morph into a second photograph. For instance, a slot game may appear to morph into a poker game. Other examples of interpolation schemes in the context of defining method sequences are described with respect to FIG. 3.

Operating parameters of the virtual camera, such as its position at a particular time, are used to define a 3-D surface in the gaming environment, which is projected on to a 2-D surface to produce the photograph. The 3-D surface may comprise portions a number of 3-D objects in the 3-D gaming environment. The 3-D surface may also be considered a 3-D object. Thus, a photograph is a 2-D image derived from 3-D coordinates of objects in the 3-D gaming environment. The virtual camera may represent gaming logic stored on the gaming machine necessary to render a portion of the 3-D gaming environment 400 to a 2-D image displayed on the gaming machine. The photograph is converted into a video frame, comprising a number of pixels, which may be viewed on a display screen on the gaming machine.

The transformation performed by the virtual camera allowing a portion of the virtual gaming environment to be viewed one or more display screens on the gaming machine may be a function of a number of variables. The size of lens in the virtual gaming environment, the position of the lens, a virtual distance between the lens and the photograph, the size of the photograph, the perspective and a depth variable assigned to each object are some of the variables that may be incorporated into a transformation by the virtual camera that renders a photograph of the virtual gaming environment. The resolution of the display screen on the gaming machine may govern the size of a photograph in the virtual camera. A typical display screen may allow a resolution of 800 by 600 color pixels although higher or lower resolution screens may be used. A "lens size" on the virtual camera defines a window into the virtual gaming environment. The window is sometimes referred to as a viewport. The size and position of the lens determines what portion of the virtual gaming environment 400 the virtual camera views. In present invention, methods may be defined that perform virtual camera manipulations. These methods may be used in method sequences defined in script files as described with respect to FIG. 3.

After the photograph of the virtual gaming environment has been generated, other effects, such as static and dynamic anti-aliasing, may be applied to the photograph to generate a frame displayed on one or more displays located on the gaming machine. Typically, the mathematical and logical operations, which are encoded in gaming software logic, necessary to perform a particular transformation and generate a video frame may be executed by video cards and graphics cards located on the gaming machine and specifically designed to perform these operations. The graphics cards usually include graphical processing units (GPUs). However, the transformation operations may also be performed by one or more general purpose CPUs located on the gaming machine or combinations of GPUs and CPUs.

In general, the 2D/3D video graphics accelerators or coprocessors, often referred to as graphics processing units (GPUs), are located on or connected to the master gaming controller and are used to perform graphical operations. The solutions described are most commonly found as video cards. The graphical electronics may be incorporated directly onto the processor board (e.g. the master gaming controller) of the gaming machine, and even tightly integrated within other very large scale integrated chip solutions. The integration methods are often cost saving measures commonly used to reduce the costs associated with mass production. For instance, video cards, such as the Vivid!XS from VideoLogic Systems (VideoLogic Systems is a division of Imagination Technologies Group plc, England) may used to perform the graphical operations described in the present invention. As another example, video cards from Nvidia Corporation (Santa Clara, Calif.) may be employed. In one embodiment, the video card may be a multi-headed 3-D video card, such as a Matrox G450 (Matrox Graphics Inc., Dorval, Quebec, Canada). Multi-headed video cards let a single graphics card power two displays simultaneously or render two images simultaneously on the same display.

When displaying photographs from a virtual camera in a 3-D gaming environment, a single image from the camera may be divided among a plurality of display devices. For instance, four display screens may be used to display one quarter of a single image. The video feeds for each of the plurality of display devices may be provided from a single video card. Multi-headed video cards let a single graphics card (or graphics subsystem) display output on two or more displays simultaneously. This may be multiple output rendering for each display or one rendering over multiple displays, or variation of both. For example, when a multi-headed video card is used, a first head on the multi-headed video card may be used to render an image from a first virtual camera in a 3-D gaming environment and a second head on the multi-head video card may be used to render a second image from a second virtual camera in a 3-D gaming environment. The rendered first and second images from the first head and the second head may be displayed simultaneously on the same display or the first image may be displayed on a first display and the second image may be displayed on a second display.

Returning to FIG. 4, three lenses, 405, 406 and 407 used in a virtual camera are shown positioned at three locations in the virtual gaming environment. Each lens views a different portion of the gaming environment. The size and shape of the lens may vary which changes a portion of the virtual gaming environment captured by the lens. For instance, lenses 405 and 406 are rectangular shaped while lens 407 is ovular shaped.

Lens 406 is positioned to view the "game display" for a game outcome presentation rendered on surface 408. The portion of the gaming environment captured by lens 406 is a six-sided shape 420. As described above, the game display may contain the presentation of a particular game played on the gaming machine, such as a hand of cards for a poker game. After applying an appropriate transformation, a photograph 424 of the portion of the virtual gaming environment 400 in volume 420 is generated by the virtual camera with lens 406.

Using differing terminology common within the 3D graphics community, the lenses 405, 406 and 407 may be described as a camera. Each camera has the ability to have different settings. A scene in the 3-D gaming environment is shot from the camera's viewpoint. A different scene is captured from each camera Thus, the scene is rendered from the camera to produce and image.

The photograph 424 generated from the virtual camera with lens 406 may be viewed on one or more display screens on the gaming machine. For instance, photograph 424 may be viewed on a main display on the gaming machine and a secondary display on the gaming machine. In another embodiment, a portion of photograph 424 may be displayed on the main display and a portion of the photograph may be displayed simultaneously on a secondary display. In yet another embodiment, a portion of photograph 424 may be displayed on a first gaming machine while a portion of photograph 424 may be displayed simultaneously on a second gaming machine.

Lens 405 of a virtual camera is positioned to view volume 421 in the virtual gaming environment 400. The volume 421 intersects three faces, 408, 410 and 412, of box 401. After applying an appropriate transformation, a photograph 425 of the portion of the virtual gaming environment 401 in volume 421 is rendered by the virtual camera with lens 405 which may be displayed on one of the display screens on a gaming machine.

Lens 407 of a virtual camera is positioned to view volume 422 in the virtual gaming environment 400. The ovular shape of the lens produces a rounded volume 422 similar to a light from a flashlight. The volume 422 intersects a portion of face 410 and a portion of plane 414 including a portion of the shadow 403. After applying an appropriate transformation, a photograph 426 of the portion of the virtual gaming environment 401 in volume 422 is rendered by the virtual camera with lens 407 which may be displayed on one or more of the display screens on a gaming machine. For instance, a gaming machine may include a main display, a secondary display, a display for a player tracking unit and a remote display screen in communication with the gaming machine via a network of some type. Any of these display screens may display photographs rendered from the 3-D gaming environment.

A sequence of photographs generated from one or more virtual cameras in the gaming environment 401 may be used to present a game outcome presentation on the gaming machine or present other gaming machine features. The sequence of photographs may appear akin to movie or film when viewed by the player. For instance, a 3-D model of a virtual person may appear to speak. Typically, a refresh rate for a display screen on a gaming machine is on the order of 60 HZ or higher and new photographs from virtual cameras in the gaming environment may be generated as the game is played to match the refresh rate.

The sequence of photographs from the one or more virtual cameras in the gaming environment may be generated from at least one virtual camera with a position and lens angle that varies with time. For instance, lens 406 may represent the position of a virtual camera at time, t1, lens 405 may represent the position of the virtual camera at time, t2, and lens 407 may represent the position of the virtual camera at time t3. Photographs generated at these three positions by the virtual camera may be incorporated into a sequence of photographs displayed on a display screen.

The position of the virtual camera may change continuously between the positions at times t1, t2, t3 generating a sequence of photographs that appears to pan through the virtual gaming environment. Between the positions at times t1, t2, t3, the rate the virtual camera is moved may be increased or decreased. Further, the virtual camera may move non-continuously. For instance, a first photograph in a sequence of photographs displayed on a display screen may be generated from the virtual camera using the position of lens 406. The next photograph in the sequence of photographs may be generated from the virtual camera using the position of lens 405. A third photograph in the sequence of photographs may be generated from the virtual camera using the position of lens 407. In general, the virtual camera in the gaming environment 401 may move continuously, non-continuously and combinations thereof.

In a 3D system getting the 3D object data from the artist's tools to the real-time environment may be a challenging problem. In a third party development environment, a game presentation designer may use many different graphics tools to generated graphics for a game presentation. One example of a 3-D graphics design tool that may used with the present invention is LightWave by NewTek (San Antonio, Tex.). A graphics design tool such as LightWave may be used in a presentation design system that allows a designer to generate a presentation for a game of chance (see FIGS. 5 and 6).

As described above, a method sequence may be used to operate on a model file. In the present invention, model file formats may be specified. As an example, the graphic model file formats may comprise 3D model information, flags supported by the gaming system and other special features that are supported by the 3D graphics engine used on a gaming machine. The model file formats may provide an API that allows the method sequence to be decoupled from the model file. Thus, a method sequence may operate on any model file in the specified model file format. For instance, a method sequence may be used to operate on a first model file to generate a first presentation component and then the method sequence may be used to operate on a second model file to generate a second presentation component.

Since different graphics tools as well as other design tools may output different information in different formats. The present invention may include model file conversion tools used to convert model files from one format to another format. For instance, a 3-D graphics file from a LightWave graphics tool may be converted into a model format that may be used with a method sequence. The model file converters may be used with the presentation design system as described with respect to FIGS. 5 and 6.

Figure 5:
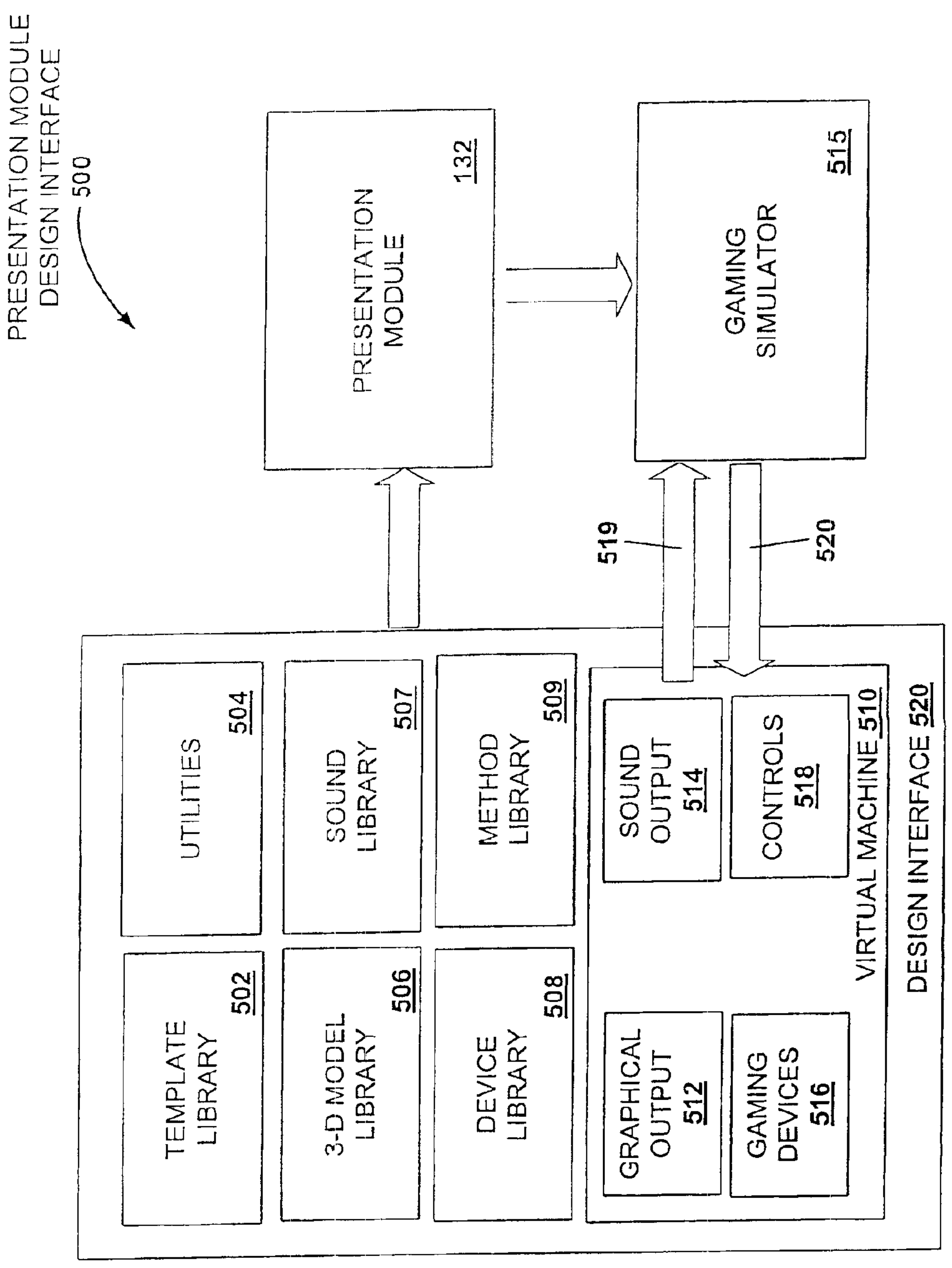
FIG. 5 is a block diagram of a presentation module design utility for one embodiment of the present invention.

FIG. 5 is a block diagram of a presentation design system 500 for one embodiment of the present invention. The presentation design system 500 may be used to generate a presentation module 132. The presentation module design utility 520 may include tools, libraries, templates and databases that may be used to help the presentation designer define the components of a presentation module 132.

In one embodiment of the present invention, the presentation module design utility may include but is not limited to: 1) presentation module design interface 520 that may be used to generate one or more presentation modules 132 and 2) a gaming simulator 515 that may be used to simulate the output of the one or more presentation modules 132 on a virtual gaming machine 510. The gaming simulator may utilize the gaming software 100 used on a gaming machine as was described with respect to FIGS. 1A and 1B. Thus, the gaming simulator 515 may provide game flow logic and presentation state logic for many different types of games. The presentation designer may use the gaming simulator 515 to specify implementations of graphics, sounds and gaming devices that may be required for the game states and presentation states generated by the game flow logic and presentation state logic loaded into the gaming simulator. The specific implementations generated by the designer may be incorporated into presentation modules.

A presentation module 132 may be processed by the gaming simulator 515. The output from the gaming simulator 515 may be displayed to a designer on a virtual gaming machine 510. The virtual gaming machine 510 may simulate portions of the machine interface that a game player may see when playing the gaming machine. Thus, the presentation designer may be able to input information 512 into to the gaming simulator 515 via the virtual machine 510 and may be able to see output 520 from the gaming simulator 515 on the virtual machine 510. As an example, the presentation designer may activate an input button on the virtual machine 510 and then view an animation of the input button on the virtual machine that was defined in a presentation module 132 generated using the presentation design system 500. As another example, the presentation designer may be able to initiate a game outcome presentation on the virtual machine and then listen to an audio presentation for the game outcome in a presentation module 132 generated using the presentation design system 500. While listening to the audio presentation, the designer may be able to view a light pattern sequence on the virtual machine 510 generated from a presentation module 132 generated using the presentation design system 500.

In general, the virtual machine 510 may be a presentation interface used by the designer to design a game outcome presentation. The virtual machine 510 may include but is not to limited to simulations of 1) graphical output 512, 2) sound output 514, 3) gaming device output 516 (e.g., light panels, mechanical reels, tactile feedback device, scent generation devices, etc.) and 4) input switches and meters 518. Using the virtual machine, a presentation designer may simulate many aspects of a game outcome presentation on a gaming machine without the use of an actual gaming machine. For instance, presentation design system 500 and its various components including the virtual machine 515 may be implemented on a personal computer or work station adapted for gaming simulation. Thus, one advantage of the presentation design system 500 is that a third party developer may be able to develop a game presentation for a gaming machine without the use of an actual gaming machine.

In some embodiments, the gaming simulator 515 may be essentially a "black box" to the presentation designer. Thus, the presentation designer may simply specify inputs for the gaming simulator 515. The gaming simulator 515 receives the specified inputs and then may output an appropriate output to the virtual machine 510 or some other output in the design interface. However, since the gaming simulator 515 is a "black box" to the presentation designer, the presentation designer may not be required to have any knowledge of the logical operations within the gaming simulator 515. Thus, the presentation designer may focus solely on the presentation design. This capability may speed up the game design process and allow more people/groups to design games of chance for a gaming machine in a third-party development environment.

In one embodiment of the present invention, a presentation module design interface 520 may include but is not limited to: 1) template library 502, 2) design utilities 504, 3) a 3-D model library 506, 4) a sound library 507, 5) a device library, 6) a method library, 7) a virtual machine 510, 8) a tactile feed back library (not shown), 9) a scent library (not shown) and 10) an animation sequence library (not shown). The template library 502 may include but is not limited to templates of previously designed method sequences and templates for blank formatted script files that may be used to build one or more method sequences. The templates may specify the methods that are used for one or more method sequences. The designer may customize the method sequences in the templates by modifying or specifying one or more of input parameters used in the method sequences. Thus, the templates allow frequently used method sequences to be easily re-used and modified. The template library 502 may include templates with method sequences that generate graphical output and generate audio output. In addition, the template library may include templates with method sequences that control a gaming device.

The method sequences may be specified, modified, completed and stored using a presentation module design interface provided with presentation design system. The presentation module design interface may include input mechanisms and output mechanisms such as a keyboard, mouse and display that allow a designer to select and modify various method sequences, select and view various module files an generate presentation modules 132. An example of a GUI for a presentation module design interface is described with respect to FIG. 6.

The 3-D model library 506, sound library 507 and device library 509 may include but are not limited to a) 3-D models and graphical components that may be used in a presentation module, b) audio components that may be used in a presentation module and c) abstractions of gaming devices, such as device drivers, that may be used in a presentation module. The method library 507 may include a list of methods, a description of the function of the method and a description of the required input parameters for each method. The utilities 504 may include any tools that a designer may use to aid with the design of a presentation module. For instance, one tool may allow the designer to determine the presentation state requirements for each game state generated by the gaining simulator. Another tool may allow the designer to simulate and manipulate animation sequences on the display screen.

Figure 6:
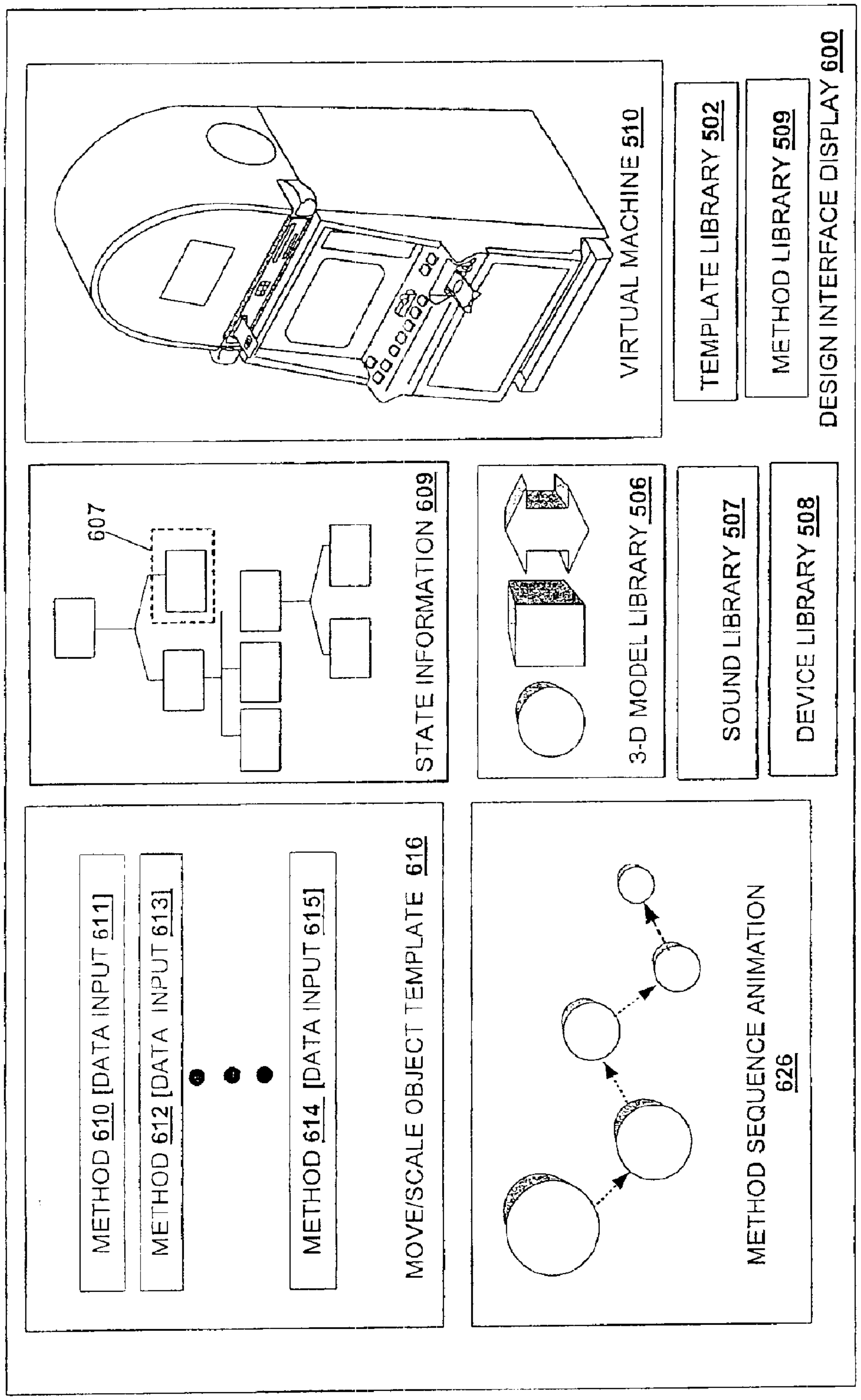
FIG. 6 is a block diagram of a presentation component design interface display for one embodiment of the present invention.

FIG. 6 is a block diagram of a presentation module design interface display 600 for one embodiment of the present invention. The display 600 includes a move/object method sequence template 616, a method sequence animation window 626, a state information utility 609, a 3-D model library 506, a sound library 507, a device library 508, a template library 502, a method library 509 and a virtual machine 510. A designer may use the move/scale object method sequence template 616 to generate a method sequence that moves and scales and object. The template 616 may comprise a series of methods including 610, 612 and 614 with corresponding input data 611, 613 and 615. A designer may customize the template 616 by specifying the input data 611, 613 and 615. The designer may view a method sequence in the template 616 by selecting a model from the 3-D model library and applying the method sequence in the template 616.

In one embodiment, the method sequence animation may be viewed in the method sequence animation window 626. In the window 626, the method sequences in the template 616 have been applied to a cylindrical object selected from the 3-D model library 506. The method sequence in the template 616 generates an animation where the object moves and decreases in size as a function of time as indicated by the arrows in window 626. In another embodiment, the template 616 may be used to create a presentation module which may be viewed by the designer on the virtual machine 510.

The state information utility 609 may allow a designer to step through the logical game states on a gaming machine and determine the presentation requirements for each state. For instance, state 607 may require an animate button sequence and may allow for an audio output on the gaming machine. The game states may be generated by the gaming simulator 515 described with reference to FIG. 5. The designer may use the virtual machine interface 510 to step through the game. For instance, the designer may select input buttons on the virtual machine 510 and begin a game and then see simultaneously which game states are generated in the state information window 609 as the game progresses on the virtual machine 510.

Figure 7:
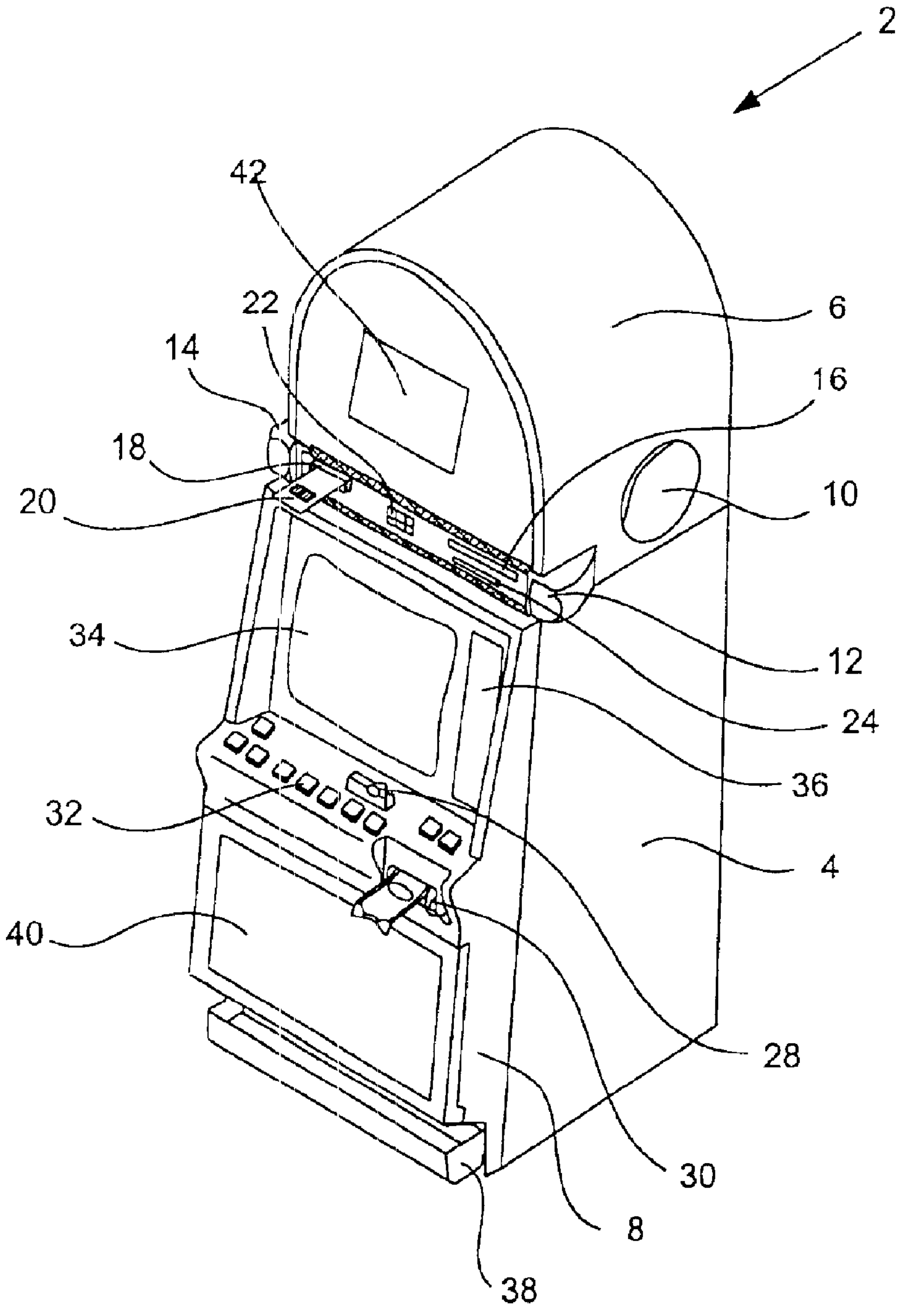
FIG. 7 is a perspective drawing of a gaming machine having a top box and other devices.

In FIG. 7, a perspective drawing of video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. Many possible games, including traditional slot games, video slot games, poker games, pachinko games, multiple hand poker games, paigow poker games, black jack games, keno games, bingo games, roulette games, craps games, checkers, board games and card games may be provided with gaming machines of this invention.

The bill validator 30, coin acceptor 28, player-input switches 32, video display monitor 34, and information panel are devices used to play a game on the game machine 2. The devices are controlled by circuitry (See FIG. 8) housed inside the main cabinet 4 of the machine 2. In the operation of these devices, critical information may be generated that is stored within a non-volatile memory storage device 234 (See FIG. 8) located within the gaming machine 2. For instance, when cash or credit of indicia is deposited into the gaming machine using the bill validator 30 or the coin acceptor 28, an amount of cash or credit deposited into the gaming machine 2 may be stored within the nonvolatile memory storage device 234. As another example, when important game information, such as the final position of the slot reels in a video slot game, is displayed on the video display monitor 34, game history information needed to recreate the visual display of the slot reels may be stored in the non-volatile memory storage device. The type of information stored in the non-volatile memory may be dictated by the requirements of operators of the gaming machine and regulations dictating operational requirements for gaming machines in different gaming jurisdictions. In the description that follows, hardware and methods for storing critical game information in a non-volatile storage device are described within the context of the operational requirements of a gaming machine 2.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information and a card reader 24 for entering a magnetic striped card containing player tracking information. Further, the top box 6 may house different or additional devices than shown in the FIG. 7. For example, the top box may contain a bonus wheel or a back-lit silk screened panel which may be used to add bonus features to the game being played on the gaming machine. During a game, these devices are controlled and powered, in part, by the master gaming controller 224 (see FIG. 8) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Figure 8:
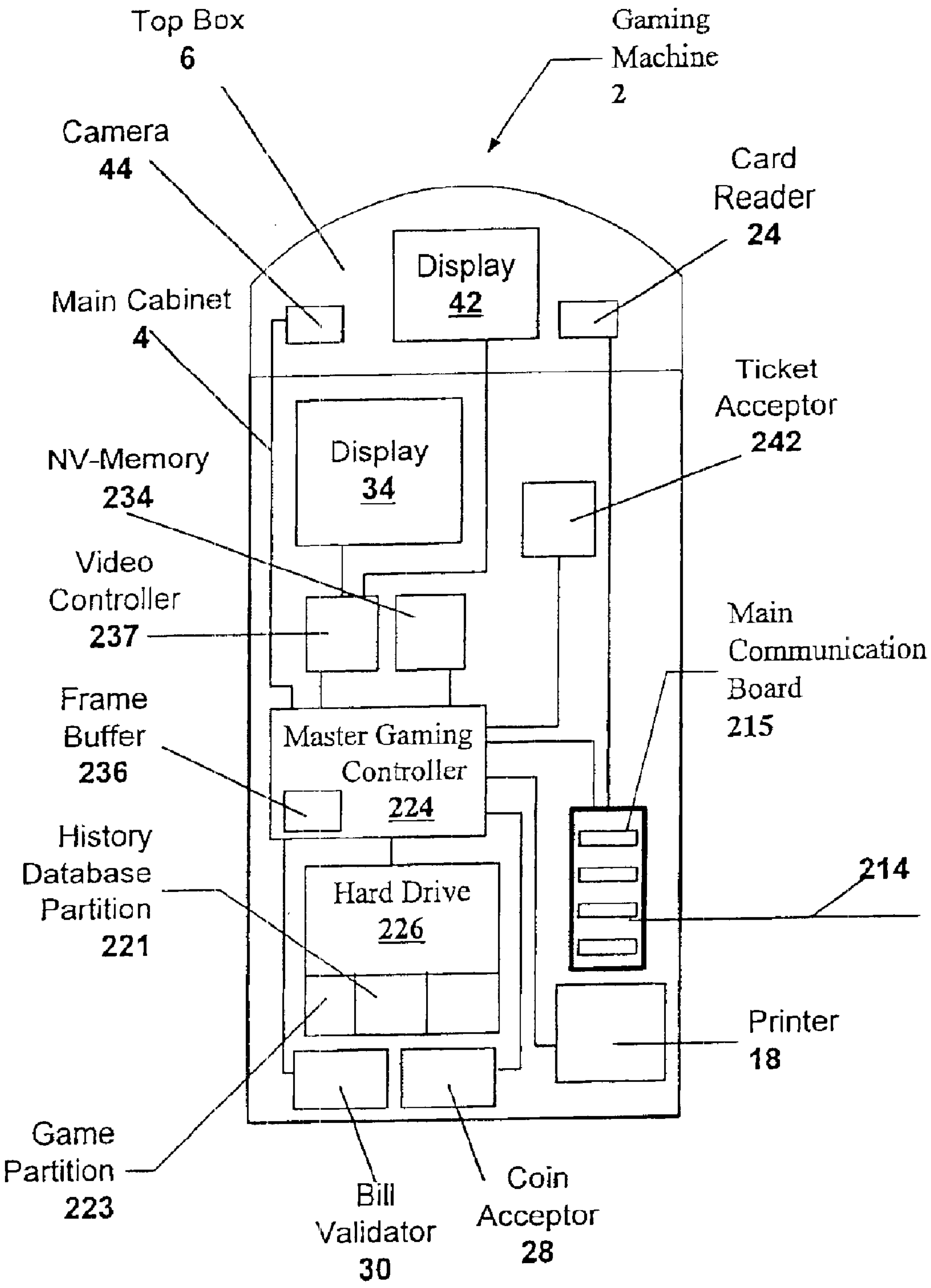
FIG. 8 is a block diagram of a gaming machine of the present invention.

Returning to the example of FIG. 8, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit. During the game, the player typically views game information and game play using the video display 34.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. The presentation components of the present invention may be used to determine a display format of an input button. For instance, as described, above, when a touch screen button is activated on display screen 34, a presentation component may be used to generate an animation on the display screen 34 of the button being depressed (e.g., the button may appear to sink into the screen).

Certain player choices may be captured by player tracking software loaded in a memory inside of the gaming machine. For example, the rate at which a player plays a game or the amount a player bets on each game may be captured by the player tracking software. The player tracking software may utilize the non-volatile memory storage device to store this information.

During certain game events, the gaming machine 2 may display visual and auditory effects that can be perceived by the player. These effects add to the excitement of a game, which makes a player more likely to continue playing. The presentation components of the present invention may be used to specify light patterns, audio components or activate other gaming devices in a specified manner, such as a bonus wheel or mechanical reels, as part of game outcome presentation. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive coins or game tokens from the coin tray 38 or the ticket 20 from the printer 18, which may be used for further games or to redeem a prize. Further, the player may receive a ticket 20 for food, merchandise, or games from the printer 18.

FIG. 8 is a block diagram of a gaming machine 2 of the present invention. Components that appear in FIG. 7 are identified by common reference numerals. A master gaming controller 224 controls the operation of the various gaming devices and the game presentation on the gaming machine 2. The master gaming controller 224 may communicate with other remote gaming devices such as remote servers via a main communication board 215 and network connection 214. The master gaming controller 224 may also communicate other gaming devices via a wireless communication link (not shown). The wireless communication link may use a wireless communication standard such as but not limited to IEEE 802.11a, IEEE 802.11b, IEEE 802.11x (e.g. another IEEE 802.11 standard such as 802.11c or 802.11e), hyperlan/2, Bluetooth, and HomeRF.

Using a game code and graphic libraries stored on the gaming machine 2, the master gaming controller 224 generates a game presentation which is presented on the displays 34 and 42. The game presentation is typically a sequence of frames updated at a rate of 75 Hz (75 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 34, a player is able to visually determine the outcome of the game.

Each frame in sequence of frames in a game presentation is temporarily stored in a video memory 236 located on the master gaming controller 224 or alternatively on the video controller 237. The gaming machine 2 may also include a video card (not shown) with a separate memory and processor for performing graphic functions on the gaming machine. Typically, the video memory 236 includes 1 or more frame buffers that store frame data that is sent by the video controller 237 to the display 34 or the display 42. The frame buffer is in video memory directly addressable by the video controller. The video memory and video controller may be incorporated into a video card which is connected to the processor board containing the master gaming controller 224. Tie frame buffer may consist of RAM, VRAM, SRAM, SDRAM, etc.

The frame data stored in the frame buffer provides pixel data (image data) specifying the pixels displayed on the display screen. In one embodiment, the video memory includes 3 frame buffers. The master gaming controller 224, according to the game code, may generate each frame in one of the frame buffers by updating the graphical components of the previous frame stored in the buffer. Thus, when only a minor change is made to the frame compared to a previous frame, only the portion of the frame that has changed from the previous frame stored in the frame buffer is updated. For example, in one position of the screen, a 2 of hearts may be substituted for a king of spades. This minimizes the amount of data that must be transferred for any given frame. The graphical component updates to one frame in the sequence of frames (e.g. a fresh card drawn in a video poker game) in the game presentation may be performed using various graphic libraries stored on the gaming machine. This approach is typically employed for the rendering of 2-D graphics. For 3-D graphics, the entire screen is typically regenerated for each frame.

Pre-recorded frames stored on the gaming machine may be displayed using video "streaming". In video streaming, a sequence of pre-recorded frames stored on the gaming machine is streamed through frame buffer on the video controller 237 to one or more of the displays. For instance, a frame corresponding to a movie stored on the game partition 223 of the hard drive 226, on a CD-ROM or some other storage device may streamed to the displays 34 and 42 as part of game presentation. Thus, the game presentation may include frames graphically rendered in real-time using the graphics libraries stored on the gaming machine as well as pre-rendered frames stored on the gaming machine 2.

For gaming machines, an important function is the ability to store and redisplay historical game play information. The game history provided by the game history information assists in settling disputes concerning the results of game play. A dispute may occur, for instance, when a player believes an award for a game outcome has not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage device 234 on the gaming machine and displayed in some manner to a display on the gaming machine. Details of a nonvolatile storage device that may be used with the present invention are described in co-pending U.S. application Ser. No. 09/690,931, filed on Oct. 17, 2000 by LeMay, et al., entitled "High Performance Battery Backed Ram Interface," which is incorporated herein in its entirety and for all purposes.

In some embodiments, game history information may also be stored to a history database partition 221 on the hard drive 226. The hard drive 226 is only one example of a mass storage device that may used with the present invention. The game history information is used to reconcile the dispute.

During the game presentation, the master gaming controller 224 may select and capture certain frames to provide a game history. These decisions are made in accordance with particular game code executed by controller 224. The captured frames may be incorporated into game history frames. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller 224.

Various gaming software modules used to play different types of games of chance may be stored on the hard drive 226. Each game may be stored in its own directory to facilitate installing new games (and removing older ones) in the field. To install a new game, a utility may be used to create the directory and copy the necessary files to the hard drive 226. To remove a game, a utility may be used remove the directory that contains the game and its files. In each game directory there may be many subdirectories to organize the information. Some of the gaming information in the game directories are: 1) a game process and its associated gaming software modules, 2) graphics/Sound files/Phase and presentation components described above (s), 3) a paytable file and 4) a configuration file. A similar directory structure may also be created in the NV-memory 234. Further, each game may have its own directory in the non-volatile memory file structure to allow the non-volatile memory 234 for each game to be installed and removed as needed.

On boot up, the game OS can iterate through the game directories on the hard drive 226 and detect the games present. The game OS may obtain all of its necessary information to decide on which games can be played and how to allow the user to select one (multi-game). The game manager may verify that there is a one to one relationship between the directories on the NV-memory 234 and the directories on the hard drive 226. Details of the directory structures on the NV-memory and the hard drive 226 and the verification process are described in co-pending U.S. application Ser. No. 09/925,098, filed on Aug. 8, 2001, by Cockerille, et al., titled "Process Verification," which is incorporated herein in its entirety and for all purposes.

Figure 9:
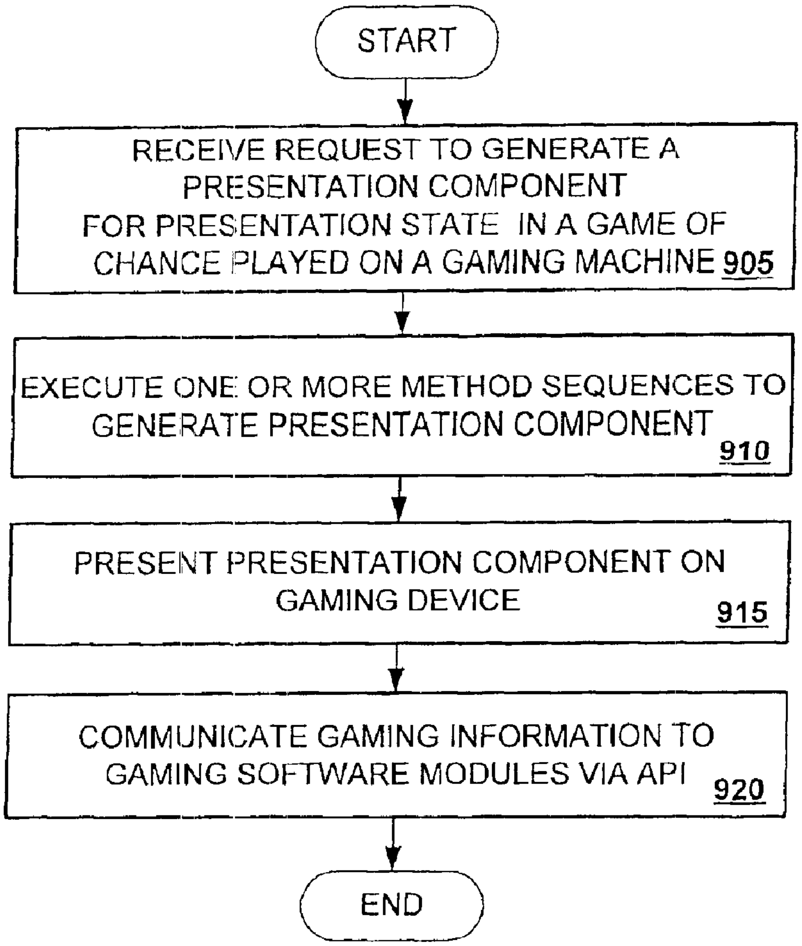
FIG. 9 is a flow chart of a method for presenting a presentation component on a gaming machine.

FIG. 9 is a flow chart of a method for presenting a presentation component on a gaming machine. In 905, a presentation module receives a request to generate a presentation component for a presentation state in a game of chance played on a gaming machine. The presentation component may be a graphical component such as an animation displayed on a display screen on the gaming machine, an audio component such as music output on an audio device on the gamin machine or a gaming device component, such as light pattern displayed on a light panel located on the gaming machine. In 910, the presentation module executes on or more method sequences to generate the presentation component. The method sequences may be stored in a script file on the gaming machine. In 915, the presentation component is presented on a gaming device such as a display screen, audio device, light panel, bonus wheel or a mechanical reel. In 920, the presentation module may communicate gaming information to one or more gaming software modules via an API. For instance, the presentation module may notify the gaming operating system that the presentation component, such as an animation, is completed.

Figure 10:
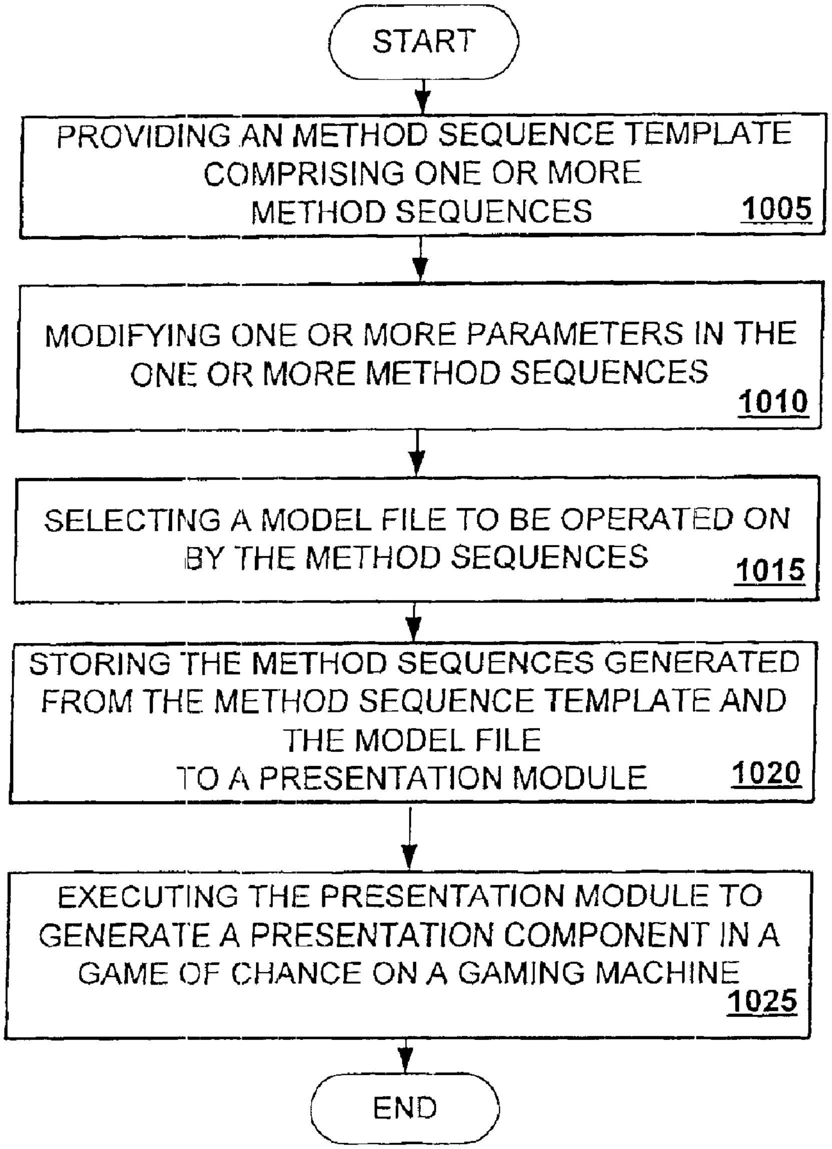
FIG. 10 is a flow chart of a method for generating a presentation component on a gaming machine.

FIG. 10 is a flow chart of a method for generating a presentation component on a gaming machine. In 1005, a method sequence template comprising one or more method sequences is generated. The method sequence template may be provided on a presentation module design interface (see FIGS. 5 and 6). The method sequence template may describe one or more method sequences that may be used to generate a presentation component on a gaming machine. The presentation component may be a graphical component such as an animation displayed on a display screen on the gaming machine, an audio component such as music output on an audio device on the gaming machine or a gaming device component, such as light pattern displayed on a light panel located on the gaming machine.

In 1010, one or more parameters in the one or more method sequences may be modified or specified. In general, as described with respect to FIG. 3, a method sequence may comprise one or more methods. Each method may include input parameters that may be used to modify the operation of the method. For instance, a method may be used to generate the color or texture of an object used in an animation sequence. The method may include parameters that may specify the color or texture of the object to be generated. As another example, a method sequence may be used to move an object in an animation sequence. The method sequence may include parameters that may be used to specify the initial and final position of the object and the rate of movement.

In 1015, a model file to be operated on by the method sequences is selected. The method sequences may operate on an object. The object may be a graphical component, an audio component or a hardware component. The hardware component may be an abstraction of a gaming device such as a device driver stored in a file. The model file specifies the object to be operated on by the method sequence. In general, the method sequences are independent of the objects in the model files. Thus, the method sequences may be re-used with different objects. For instance, a method sequence that generates an animation of an object moving may be applied to different 3-D objects that are stored in different model files.

In 1020, the method sequences generate from the method sequence template and the selected model file may be stored to a presentation module. The presentation module, as described with respect to FIGS. 1A and 1B may be used to generate a presentation component during game play on a gaming machine. In 1025, the presentation module is executed to generate the presentation component specified by the presentation module on the gaming machine.

Figure 11:
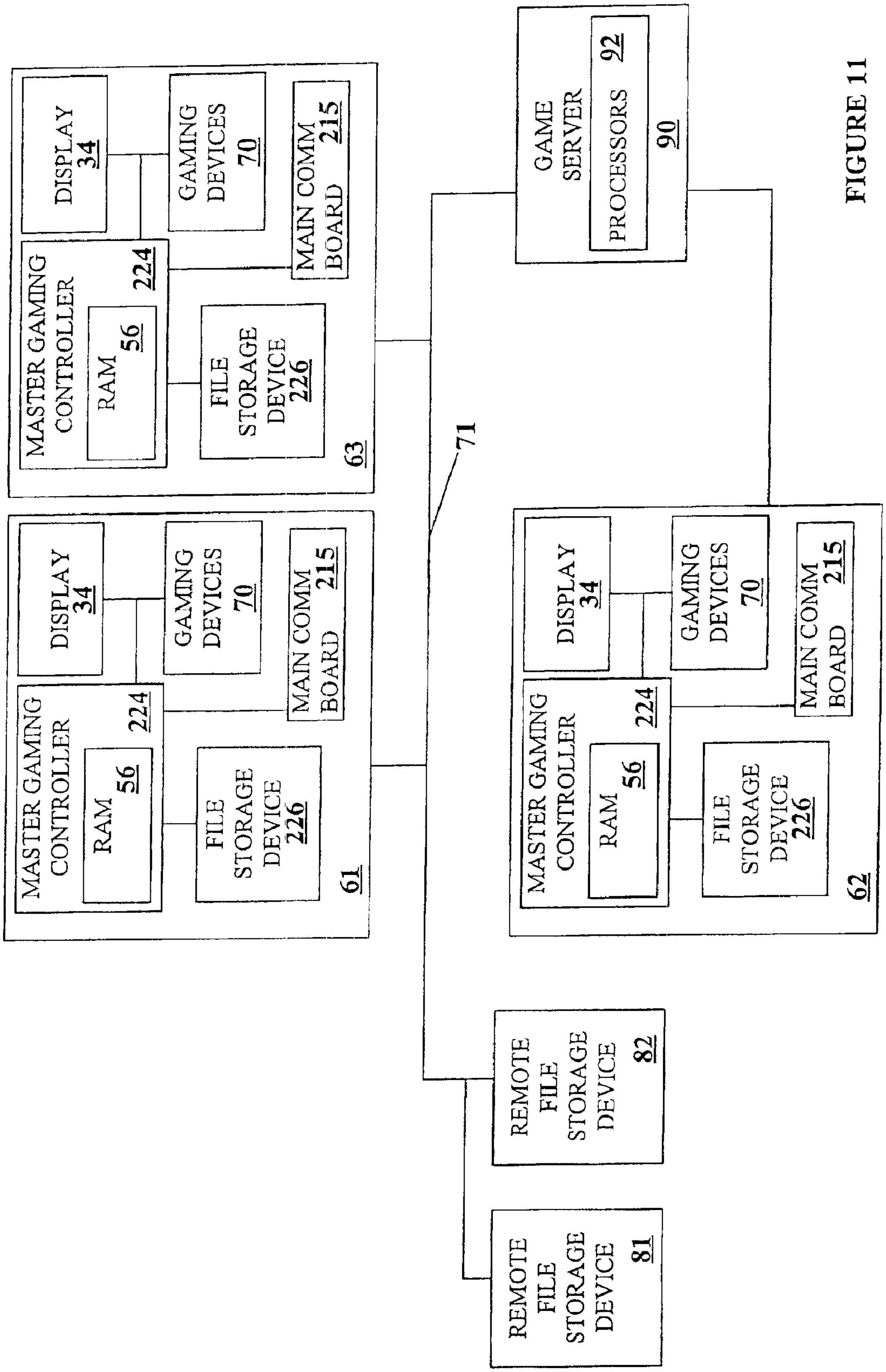
FIG. 11 is a block diagram of gaming machines that utilize distributed gaming software and distributed processors to generate a game of chance for one embodiment of the present invention.

FIG. 11 is a block diagrams of gaming machines that utilize distributed gaming software and distributed processors to generate a game of chance for one embodiment of the present invention. A master gaming controller 224 is used to present one or more games on the gaining machines 61, 62 and 63. The master gaming controller 224 executes a number of gaining software modules to operate gaming devices 70, such as coin hoppers, bill validators, coin acceptors, speakers, printers, lights, displays (e.g. 34) and other input/output mechanisms (see FIGS. 13 and 14). The master gaming controller 224 may also execute gaming software enabling communications with gaming devices located outside of the gaming machines 61, 62 and 63, such as player tracking servers, bonus game servers, game servers and progressive game servers. In some embodiments, communications with devices located outside of the gaming machines may be performed using the main communication board 215 and network connections 71. The network connections 71 may allow communications with remote gaming devices via a local area network, an intranet, the Internet or combinations thereof.

The gaming machines 61, 62 and 63 may use gaming software modules to generate a game of chance that may be distributed between local file storage devices and remote file storage devices. For example, to play a game of chance on gaming machine 61, the master gaming controller may load gaming software modules into RAM 56 that may be may be located in 1) a file storage device 226 on gaming machine 61, 2) a remote file storage device 81, 2) a remote file storage device 82, 3) a game server 90, 4) a file storage device 226 on gaming machine 62, 5) a file storage device 226 on gaming machine 63, or 6) combinations thereof. In one embodiment of the present invention, the gaining operating system may allow files stored on the local file storage devices and remote file storage devices to be used as part of a shared file system where the files on the remote file storage devices are remotely mounted to the local file system. The file storage devices may be a hard-drive, CD-ROM, CD-DVD, static RAM, flash memory, EPROM's, compact flash, smart media, disk-on-chip, removable media (e.g. ZIP drives with ZIP disks, floppies or combinations thereof For both security and regulatory purposes, gaming software executed on the gaming machines 61, 62 and 63 by the master gaming controllers 224 may be regularly verified by comparing software stored in RAM 56 for execution on the gaming machines with certified copies of the software stored on the gaming machine (e.g. files may be stored on file storage device 226), accessible to the gaming machine via a remote communication connection (e.g., 81, 82 and 90) or combinations thereof.

The game server 90 may be a repository for game software modules and software for other game services provided on the gaming machines 61, 62 and 63. In one embodiment of the present invention, the gaming machines 61, 62 and 63 may download game software modules from the game server 90 to a local file storage device to play a game of chance or the download may be initiated by the game server. One example of a game server that may be used with the present invention is described in co-pending U.S. patent application Ser. No. 09/042,192, filed on Jun. 16, 2000, entitled "Using a Gaming Machine as a Server" which is incorporated herein in its entirety and for all purposes. In another example, the game server might also be a dedicated computer or a service running on a server with other application programs.

In one embodiment of the present invention, the processors used to generate a game of chance may be distributed among different machines. For instance, the game flow logic to play a game of chance may be executed on game server 92 by processor 90 while the game presentation logic may be executed on gaming machines 61, 62 and 63 by the master gaming controller 224. The gaming operating systems on gaming machines 61, 62 and 63 and the game server 90 may allow gaming events to be communicated between different gaming software modules executing on different gaming machines via defined APIs. Thus, a game flow software module executed on game server 92 may send gaming events to a game presentation software module executed on gaming machine 61, 62 or 63 to control the play of a game of chance or to control the play of a bonus game of chance presented on gaming machines 61, 62 and 63. As another example, the gaming machines 61, 62 and 63 may send gaming events to one another via network connection 71 to control the play of a shared bonus game played simultaneously on the different gaming machines or in general to affect the game play on another machine.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A gaining machine comprising:

a master gaming controller designed to generate a game of chance including wagering played on the gaming machine by executing a plurality of gaming software modules;

a memory device storing the plurality of gaming software modules;

a gaming operating system comprising logic to load and unload the gaming software modules into a RAM from the memory device and to control the play of the game of chance;

a game flow logic software module, loaded by the gaming operating system, including game flow logic to generate a sequence of game states used in the game of chance;

a presentation logic module, loaded by the gaming operating system, comprising presentation state logic to generate a presentation state for each game state in the game of chance wherein the presentation state logic is decoupled from the game flow logic such that the game flow logic describing future game states does not affect the presentation state logic for a current presentation state and wherein the presentation state logic accesses one or more presentation modules to generate a presentation for the current presentation state; and the one or more presentation module loaded by the gaming operating system and communicating with the presentation logic module via an application program interface, wherein each presentation logic module includes one or more script-based method sequences for performing a sequence of operations on a model of one of a graphical component a sound component or a device component;

a game device, couple to the gaming machine, for outputting the operations performed on the graphical component, the sound component or the device component.

2. The gaming machine of claim 1, wherein the application program interface is used to communicate sequence events used to control the play of the game of chance wherein the game flow logic uses the sequence events to determine when to advance from a current game state to a next game state.

3. The gaming machine of claim 1, wherein the game of chance is selected from group consisting of slot games, poker games, pachinko games, multiple band poker games, pai-gow poker games, blackjack games, keno games, bingo games, roulette games, craps games, checkers, board games and card games.

4. The gaming machine of claim 1, wherein the presentation of the gains of chance comprises a plurality of presentation states.

5. The gaming machine of claim 4, wherein the presentation logic module further comprises logic that is used to determine one or more presentation components that are used in each presentation state.

6. The gaming machine of claim 5, wherein the presentation component is at least one of a graphical component, an audio component, a gaming device component and combinations thereof.

7. The gaming machine of claim 5, wherein the presentation component is presented on a gaming device.

8. The gaming machine of claim 1, wherein the gaming device is at least one of a display screen, an audio output device, a lighting device, a bonus wheel, a mechanical reel, a tactile feedback device and a scent generation device.

9. The gaming machine of claim 1, wherein the output from the gaming device is designed to stimulate a game player's sight, hearing, smell, taste and combinations thereof.

10. The gaming machine of claim 1, wherein the script-based method sequence comprises one or more input parameters that are used to modify the presentation component generated by the script-based method sequence.

11. The gaming machine of claim 10, wherein the script-based method sequence is used with a first set of input parameters to generate a first presentation component and wherein the method sequence is used with a second set of input parameters to generate a second presentation component.

12. The gaming machine of claim 11, wherein the first presentation component and the second presentation are generated using the same method sequence logic.

13. The gaming machine of claim 1, wherein the script-based method sequence operates on a model file to generate the presentation component.

14. The gaming machine of claim 13, wherein the model file comprises a graphical component, an audio component, a gaming device component and combinations thereof.

15. The gaming machine of claim 13, wherein the script-based method sequence operates on a first model file to generate a first presentation component and wherein the script-based method sequence operates on a second modal file to generate a second presentation component.

16. The gaming machine of claim 15, wherein the first presentation component and second presentation component are generated using the same script-based method sequence logic.

17. The gaming machine of claim 1, wherein the script-based method sequence is used to change a property of a graphical object displayed on a display screen of the gaming machine.

18. The gaming machine of claim 17, wherein the property is a color, a size, a position, a shading and a texture.

19. The gaming machine of claim 1, wherein the script-based method sequence is used to generate an animation sequence.

20. The gaming machine of claim 19, wherein the script-based method sequence is used to generate a sequence of video frames that provide an animated transition between a first video frame and a second video frame.

21. A method of providing a presentation component used in a play of a game of chance on a gaming machine, the method comprising:

providing a method sequence template comprising one or more method sequences wherein the one or more method sequences are script-based;

selecting a model file to be operated on by the method sequences;

executing the method sequences to generate a presentation component used in a presentation of the game of chance on the gaming machine.

22. The method of claim 21, further comprising:

storing the method sequences generated from the method sequence template and the model file to a presentation module.

23. The method of claim 22, further comprising:

simulating the presentation module on a presentation interface.

24. The method of claim 21, further comprising:

selecting a model file from a model file library.

25. The method of claim 24, wherein the model file library comprises graphical models, sound models, gaming device models, scent models and tactile feedback models.

26. The method of claim 21, further comprising:

selecting a method sequence template from a method sequence template library.

27. The method of claim 21, further comprising:

selecting a method used in a method sequence from a method library.

28. The method of claim 21, further comprising:

generating a model file to be operated on by the method sequences.

29. The method of claim 21, further comprising:

converting the model file to a model file format used by the method sequences.

30. The method of claim 21, further comprising:

displaying the presentation component on a present interface.

31. The method of claim 21, further comprising:

specifying one or more input parameters in at least one of the method sequences.

32. The method of claim 21, further comprising:

specifying first set of input parameters in a first method sequence;

generating a first presentation component using the first set of input parameters;

specifying second set of input parameters in the first method sequence; and generating a second presentation component using the second set of input parameters.

33. The method of claim 21, further comprising:

selecting a first model file to be operated on by the method sequences;

generating a first presentation component using the first model file;

selecting a second model file to be operated on by the method sequences; and generating a second presentation component using the second model file.

* * * * *

UNITED STATES PATENT AND TRADEMARK OFFICE

CERTIFICATE OF CORRECTION

PATENT NO. : 6,902,481 B2
DATED : June 7, 2005
INVENTOR(S) : Breckner et al.

It is certified that error appears in the above-identified patent and that said Letters Patent is hereby corrected as shown below:

Column 40,
Line 63, change "gaining" to -- gaming --.

Column 41,
Line 21, change "module" to -- modules --.
Line 29, change "couple" to -- coupled --.
Line 41, change "band" to -- hand --.
Line 46, change "gains" to -- games --.

Column 42,
Line 22, change "modal" to -- model --.

Signed and Sealed this

Twenty-third Day of August, 2005

JON W. DUDAS
*Director of the United States Patent and Trademark Office*